United States Patent
Serra Alfaro et al.

(10) Patent No.: US 12,502,639 B2
(45) Date of Patent: Dec. 23, 2025

(54) METHOD FOR SEPARATING GASES IN AN OXY-FUEL COMBUSTION PROCESS BY USING OXYGEN-PERMEABLE MEMBRANES

(71) Applicant: Kerionics, S.L., Alaquàs (ES)

(72) Inventors: José Manuel Serra Alfaro, Alaquàs (ES); Isaac Herráiz Cardona, Alaquàs (ES); David Catalán Martínez, Alaquàs (ES)

(73) Assignee: Kerionics, S.L., Valencia (ES)

( * ) Notice: Subject to any disclaimer, the term of this patent is extended or adjusted under 35 U.S.C. 154(b) by 782 days.

(21) Appl. No.: 17/363,881

(22) Filed: Jun. 30, 2021

(65) Prior Publication Data

US 2022/0001326 A1    Jan. 6, 2022

Related U.S. Application Data

(63) Continuation of application No. PCT/ES2019/070902, filed on Dec. 30, 2019.

(30) Foreign Application Priority Data

Dec. 31, 2018    (ES) .................................. 201831307

(51) Int. Cl.
*B01D 53/22*    (2006.01)
*B01D 53/26*    (2006.01)
(Continued)

(52) U.S. Cl.
CPC ......... *B01D 53/226* (2013.01); *B01D 53/228* (2013.01); *B01D 53/229* (2013.01);
(Continued)

(58) Field of Classification Search
None
See application file for complete search history.

(56) References Cited

U.S. PATENT DOCUMENTS 4,391,409 A * 7/1983 Scholz .................... F02K 1/763
                                                  239/265.29
5,102,432 A * 4/1992 Prasad .................. C01B 21/045
                                                  96/9
(Continued)

FOREIGN PATENT DOCUMENTS

EP    0916386 A1 * 11/1998
EP    0962423 A1 *  6/1999
(Continued)

OTHER PUBLICATIONS

Supplementary European Search Report and Written Opinion for European Application No. EP 19907683.7 dated Jun. 28, 2024 (9 pages).
(Continued)

*Primary Examiner* — Brit E. Anbacht
(74) *Attorney, Agent, or Firm* — Boyle Fredrickson, S.C.

(57) ABSTRACT

The invention relates to a method for separating gases which comprises:
  a first step in which a gas fuel stream comprising combustible substances that produce gas products when oxidised, and an oxygen-rich inlet stream are passed through at least two modules of oxygen-separating ceramic membranes, such that the two streams come into contact through the membranes and exchange heat;
  a second step of selective diffusion of oxygen from the oxygen-rich stream to the fuel stream, such that the outlet streams from the membrane modules are an oxygen-depleted or completely oxygen-free stream and a partially or completely oxidised stream; and
  a third step of recovery of at least two separate outlet streams of at least two gases selected from oxygen, nitrogen, carbon dioxide and hydrogen.

13 Claims, 15 Drawing Sheets

(51) Int. Cl.
*C01B 3/38* (2006.01)
*C01B 13/02* (2006.01)
*C01B 32/50* (2017.01)
*F02C 3/20* (2006.01)
*F23L 7/00* (2006.01)

(52) U.S. Cl.
CPC ............... *B01D 53/265* (2013.01); *C01B 3/38* (2013.01); *C01B 13/0222* (2013.01); *C01B 13/0237* (2013.01); *C01B 13/0255* (2013.01); *C01B 32/50* (2017.08); *F02C 3/20* (2013.01); *F23L 7/00* (2013.01); *B01D 2053/222* (2013.01); *B01D 2251/102* (2013.01); *B01D 2256/10* (2013.01); *B01D 2256/12* (2013.01); *B01D 2256/16* (2013.01); *B01D 2256/22* (2013.01); *B01D 2257/102* (2013.01); *B01D 2257/104* (2013.01); *B01D 2257/108* (2013.01); *B01D 2257/504* (2013.01); *B01D 2258/05* (2013.01); *C01B 2203/0233* (2013.01); *C01B 2203/0283* (2013.01); *C01B 2203/041* (2013.01); *C01B 2203/1235* (2013.01); *C01B 2203/84* (2013.01); *C01B 2203/86* (2013.01); *C01B 2210/0004* (2013.01); *C01B 2210/0012* (2013.01); *C01B 2210/0046* (2013.01); *C01B 2210/0051* (2013.01); *C01B 2210/0053* (2013.01)

(56) References Cited

U.S. PATENT DOCUMENTS

| | | | | |
|---|---|---|---|---|
| 5,580,497 | A * | 12/1996 | Balachandran | B01D 53/228 |
| | | | | 429/495 |
| 5,630,328 | A * | 5/1997 | Hise | B01D 53/002 |
| | | | | 62/7 |
| 6,017,646 | A | 1/2000 | Prasad et al. | |
| 6,139,604 | A * | 10/2000 | Gottzmann | B01D 53/047 |
| | | | | 96/108 |
| 6,562,105 | B2 * | 5/2003 | Gottzmann | F01K 3/185 |
| | | | | 95/54 |
| 2003/0039608 | A1* | 2/2003 | Shah | C01B 13/0251 |
| | | | | 423/650 |
| 2013/0137783 | A1* | 5/2013 | Kumar | C01B 3/02 |
| | | | | 422/621 |
| 2014/0045234 | A1* | 2/2014 | Burke | C12M 21/02 |
| | | | | 435/157 |
| 2019/0233638 | A1* | 8/2019 | Zhang | C08J 5/249 |

FOREIGN PATENT DOCUMENTS

| | | | | | |
|---|---|---|---|---|---|
| EP | 1095691 | A2 * | 5/2001 | ............ | B01D 53/22 |
| EP | 1676624 | A2 * | 7/2006 | ............ | B01D 53/22 |

OTHER PUBLICATIONS

Supplementary European Search Report and Written Opinion for European Application No. EP 19907683.7 dated Aug. 30, 2022 (12 pages).

* cited by examiner

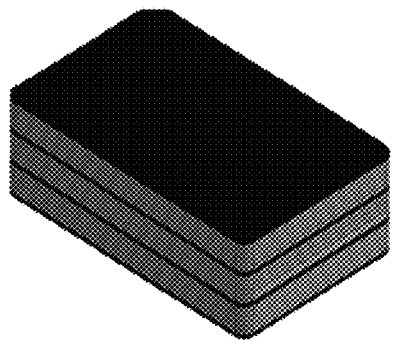
Fig. 10A  Fig. 10B
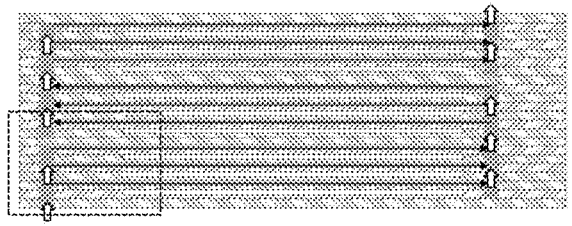
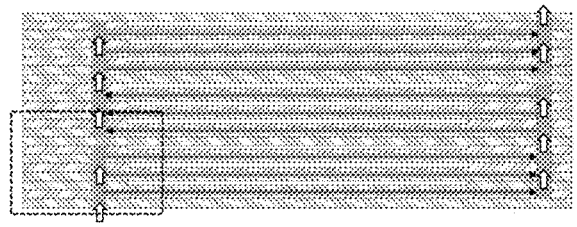
Fig. 10C  Fig. 10D
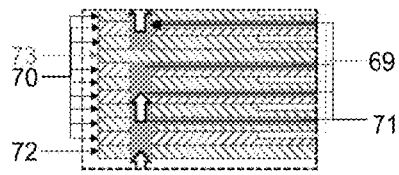
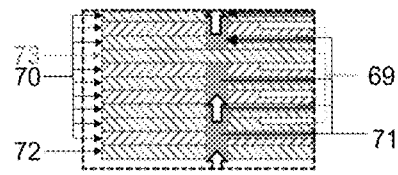
Fig. 10E  Fig. 10F
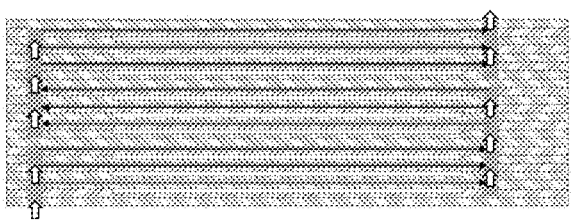
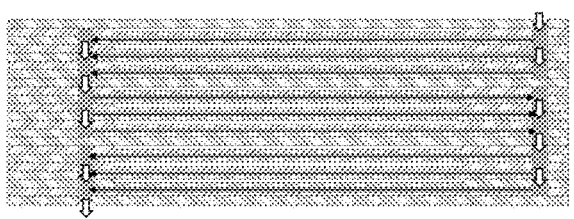
Fig. 10G  Fig. 10H

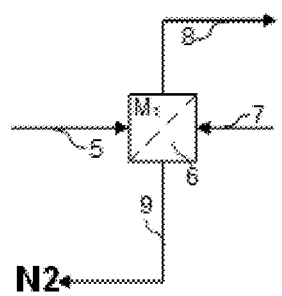
Fig. 11a
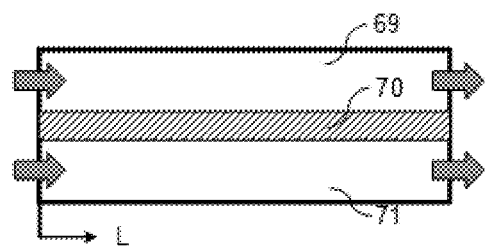 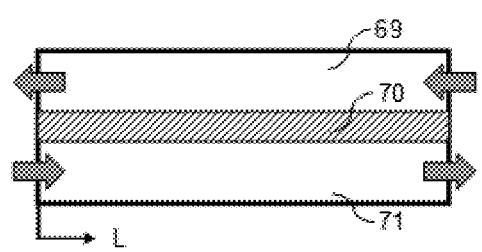
Fig. 11b     Fig. 11c
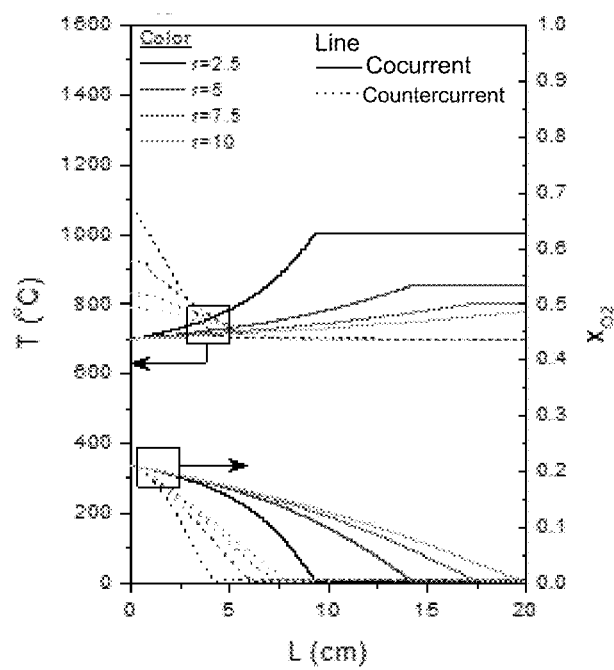
Fig. 11d

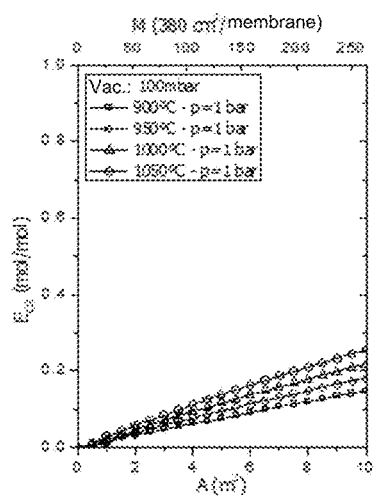
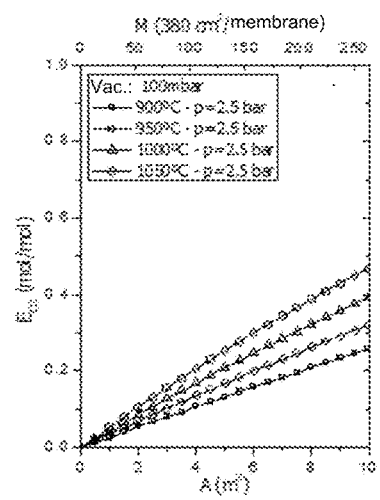
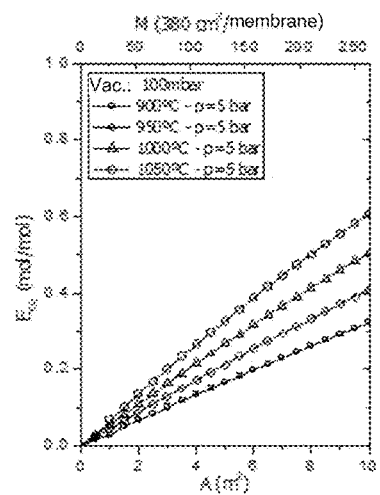
Fig. 14b
Fig. 14c
Fig. 14d
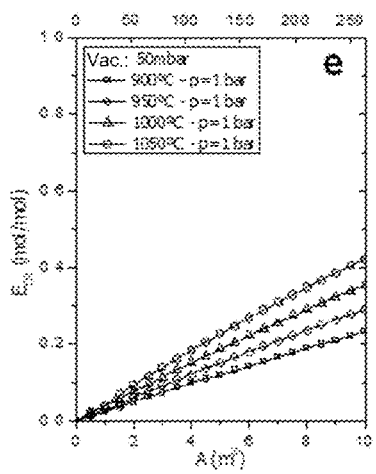
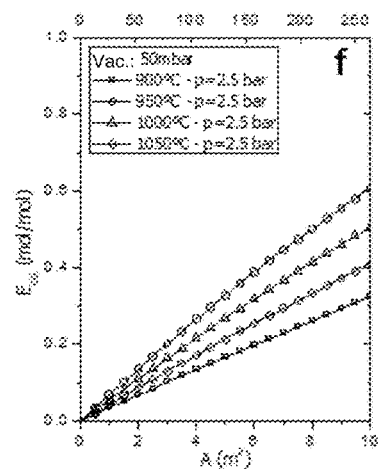
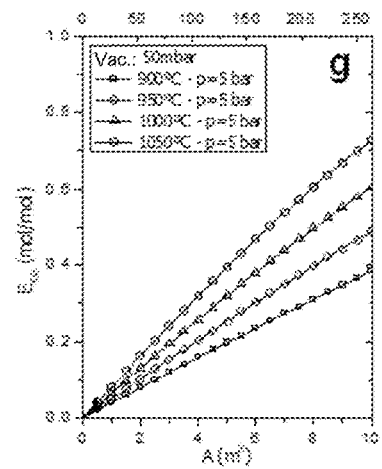
Fig. 14e
Fig. 14f
Fig. 14g

METHOD FOR SEPARATING GASES IN AN OXY-FUEL COMBUSTION PROCESS BY USING OXYGEN-PERMEABLE MEMBRANES

CROSS-REFERENCE TO RELATED APPLICATIONS

This application is a continuation of and claims priority to PCT Application No. PCT/ES2019/070902, filed Dec. 30, 2019, which, in turn, claims priority to Spanish Application No. ES201831307, filed Dec. 31, 2018, the entire contents of each application is incorporated herein by reference.

FIELD OF THE INVENTION

The present invention belongs to the field of gas separation membranes. Specifically, it refers to a new process for the simultaneous production of separate gaseous streams, of at least two gases selected from nitrogen, oxygen, hydrogen and carbon dioxide, starting from oxygen-permeable ceramic membranes in a process based on oxy-fuel combustion.

Therefore, its use is mainly oriented to oxy-fuel processes in which different comburents compositions can be used, to achieve the desired product, whereas, when by oxidizing with pure oxygen, high flame temperatures are obtained and combustion is improved at the same time that the contact of $N_2$ with the products of the process is avoided.

STATE OF THE ART PRIOR TO THE INVENTION

Introduction of Oxygen Permeation Membranes

Mixed ionic-electronic conduction membranes (MIEC) are a type of dense ceramic membranes, in which oxygen ions diffuse from one side to the other, due to the properties of the crystalline structure, due to a chemical potential gradient of oxygen between both sides of the membrane.

The selectivity of these membranes is 100% to oxygen. These membranes operate at elevated temperatures (typically in the range of 700-1000° C.) with elevated air pressures (1-2 MPa) being fed to the retention side and vacuum on the permeation side, according to Air Products & Chemicals Inc., which has resulted in a great advance in the commercialization of MIEC membrane technology for pure oxygen productions.

The concept of separating pure oxygen from the air using an MIEC membrane was explicitly proposed by Teraoka et al. in 1985. This research discovered oxygen permeation through perovskite-type oxides, i.e. $La_{1-x}Sr_xCo_{1-y}Fe_yO_{3-\delta}$ (0<x<1, 0<y<1), in the temperature range of 450-877° C., and achieved oxygen permeation flux of up to 3.1 ml·cm$^{-2}$·min$^{-1}$ through a membrane of $SrCo_{0.8}Fe_{0.2}O_{3-\delta}$, 1 mm thick, at 850° C. Subsequently, perovskite-type oxides ($ABO_3$) attracted considerable attention, gradually consolidating the field of MIEC membranes. The development of new materials has been progressively improving, focused on improving the stability of membrane materials and their permeability. To improve stability, many types of membrane materials have been developed by improving cobalt-based perovskite materials, by doping cations with stable valence state at the B site and preparing cobalt-free perovskite materials and double-phase materials.

MIEC Applications

Besides air separation for the production of pure oxygen, another important application of MIEC membranes is as membrane reactors in which the catalytic reactions are integrated with the oxygen separation process. A typical catalytic reaction in MIEC membrane reactors is the partial oxidation of natural gas to produce synthesis gas. In this membrane reactor, air is fed to the retention side and natural gas is fed to the permeation side. Ni-based catalysts are usually applied on the permeation side, that acts as a catalyst for the reaction. The oxygen permeated from the retention side reacts with natural gas to produce synthesis gas on the permeation side, and thus this membrane reactor couples oxygen stripping and catalytic reaction together with higher energy efficiency. The catalytic reaction consumes the permeated oxygen, thus increasing the oxygen chemical potential gradient across the membrane, and the oxygen flux thereby increases considerably, compared to the flux for the production of pure oxygen. Oxidative dehydrogenation of light alcanes to olefins and oxidative coupling of methane to ethane and ethylene were also considered in MIEC membrane reactors. The main advantage of catalytic membrane reactors is that the selectivity of these reactions can be improved compared to traditional fixed bed reactors, because the active oxygen species for the reactions of oxidation is oxygen in the lattice form, and not gaseous oxygen.

In the aforementioned MIEC membrane reactors, oxygen is selectively introduced into the reaction system; of course, oxygen can be selectively removed from the reaction system as long as there is a difference in oxygen chemical potential across the membrane. The energy consumption of this type of MIEC membrane reactor processes can save more than 60% energy compared to traditional industrial processes.

Principles of Operation

Oxygen permeates through the membrane via three main steps: (1) oxygen exchange at the membrane interface on the air side, (2) diffusion through the membrane, and (3) oxygen exchange at the membrane interface on the retention side.

Surface exchange reactions are complicated because for every reacting oxygen molecule there are 4 reacting electrons. The surface reaction can be simplified to $O_2 + 4e^- \rightleftarrows 2O^{2-}$ considering electrons and oxygen ions as charge carriers and neglecting the diffusion path of oxygen ions. Considering electronic holes and oxygen vacancies as charge carriers, the surface exchange reactions are rewritten as: $O_2 + 2V_{\ddot{O}} \rightleftarrows 2O_O^x + 4 h^-$ wherein $V_{\ddot{O}}$, $O_O^x$ and h* denotes the oxygen vacancies, the oxygen ions occupying the corresponding oxygen site in the crystal lattice and the holes respectively.

Although the overall reaction seems simple, it involves many side processes. For the retention side oxygen exchange reaction, widely researched in the field of solid oxide fuel cells, steps such as adsorption, electron capture, dissociation, capture of another electron and inclusion into the crystal lattice occur. The detailed mechanism is not yet clear, and may change depending on the material. The following is a widely accepted mechanism for the surface exchange of oxygen on the retention side (i) Adsorption: $O_2(g) \rightarrow O_2(ad)$; (ii) reaction with an electron: $O_2(ad) + e^- \rightarrow O_2^-(ad)$; (iii) change in adsorption state: $O_2^-(ad) \rightarrow O_2^-(ad,bi)$; (iv) reaction with an electron: $O_2^-(ad,bi) + 2e^- \rightarrow O_2^{2-}(ad,bi)$; (v) dissociation: $O_2^{2-}(ad,bi) \rightarrow 2O_2^-(ad)$; reaction with an electron: $O_2(ad) + e^- \rightarrow O_2^-(ad)$; (vi) inclusion into the crystal network: $O^{2-}(ad) + V_{\ddot{O}} \rightleftarrows O_O^x$. Each step could be the limiting step of the overall process. There are two types of diffusion pathways for oxygen ions along the membrane: through oxygen vacancies and through interstitial oxygen defects.

For the majority of perovskites and fluorites of the $ABO_3$ type, the transport of oxygen ions follows the interstitial diffusion mechanism or a hybrid between both. In the oxygen permeation process, the transport of oxygen ions occurs from the retention side to the permeate side, while the electrons are transferred in the reverse direction. Unlike an oxygen pump, based on pure oxygen ion conductors, MIEC membranes can transfer electrons internally, simplifying the complexity of the system and facilitating its large-scale application.

In summary, the transport of the oxygen ion is simultaneous to the transport of electrons or electronic holes (electronic carriers), so the material must have sufficient electronic conductivity under the operating conditions of the membrane.

The driving force responsible for oxygen transport across the membrane is the partial pressure difference of oxygen between both sides of the membrane. Thus, the flow of oxygen through a membrane is determined by the temperature and the partial pressure difference of the oxygen as well as the thickness of the membrane.

Another crucial step in the oxygen separation process in ion transport membranes is the gas exchange. As previously mentioned, the transport through the selective separation layer consists of the diffusion of oxygen ions and electronic carriers. Therefore, two surface reactions are necessary, a first one, in which gaseous oxygen is adsorbed and transformed into oxygen ions on the surface of the membrane exposed to the feed gases, generally compressed air, and a second one, in which oxygen ions are transformed into molecular oxygen and desorbed. For various reasons, these transport steps can be limiting and can cause a decrease in permeation flux through the membrane. Among the different possible reasons, we can highlight: (1) the thickness of the selective separation layer is very small, so the diffusion through the solid is much faster than the gas exchange. Typically, this critical dimension is called "characteristic length" and it is the quotient between the diffusion coefficient and the kinetic constant of the surface gas exchange reaction under the operating conditions and the composition of gases in contact with the membrane surface; (2) the membrane surface does not possess noticeable catalytic activity for the oxygen activation reaction; (3) gaseous atmospheres in contact with the surface or surfaces of the membrane discourage the adsorption/desorption of molecular oxygen and its evolution through the reaction $O_2+2e^- \leftrightarrow O^{-2}$. In industrially relevant processes, both the permeate and the Food usually present appreciable amounts of acid gases such as $CO_2$ and $SO_2$, which hinder said reaction since they passivate or inactivate the surface and compete with the adsorption and reaction centers involved in the oxygen gas exchange reaction. This harmful effect is enhanced as the process operating temperature is decreased, especially below 850° C., and when the concentration of $SO_2$ and $CO_2$ is increased. Especially negative is the effect of the $SO_2$ gas, since concentrations above 5 ppm produce severe effects on the permeation of oxygen through the membrane.

The oxygen partial pressure difference between both sides of the membrane can be achieved through two actions: (a) increasing the air pressure through compression steps; and/or (b) lowering the partial pressure of oxygen in the permeate, which is possible by applying a vacuum, diluting the oxygen in the permeate by means of a gaseous entrainment stream, or consuming the oxygen in the entrainment chamber. This last option usually consists of recirculating the exhaust gases from the combustion furnace or boiler, while increasing the operating temperature. Likewise, in line with the second option, it is possible to pass a reducing gas (generally methane or other hydrocarbons) that consumes the oxygen that permeates through the membrane to give complete or partial combustion products and release heat directly in contact with the ceramic membrane.

Types of Materials for MIECs Membranes

To understand MIEC membranes, 5 classification criteria based on crystal structure, phase composition, chemical composition, geometry, and dense layer configuration are commonly used.

Considering their crystalline structure, MIEC membranes can be classified into perovskites, membranes derived from perovskites, and fluorites. Most MIEC membranes have a perovskite-like crystal structure ($ABO_3$), where A is a large cation and B is a smaller cation. A perovskite is a crystal lattice built with octahedra of $BO_6$ with A ions located in 12 localized interstices. Some MIEC have a crystalline structure similar to a perovskite, such as Ruddlesde-Popper (R-P) with a formula of $A_{n+1}B_nO_{3n+1}$ (n=1, 2, 3, ... ). The crystal structure of this phase is similar to that of perovskite in that a number of perovskite blocks (n) have a corner shared with the octahedron BO6 modified with the AO layer along the c axis. Some MIEC have a fluorite structure, the typical example being materials based on $CeC_2$.

If the membranes only have one type of crystalline phase, they are referred to as monophasic membranes. Most perovskite membranes are monophasic, for example, $La_{1-x}Sr_xCo_{1-y}Fe_yO_{3-\delta}$ (0<x<1; 0<y<1). If the membranes have two or more phases, and both contribute to the oxygen permeation, they are referred to as dual phase membranes.

An example is the YSZ-Pd membranes, which contain a fluorite, YSZ, for the transport of oxygen ions and a metallic phase, Pd, for the transport of electrons. If the membrane has two or more phases and only one contributes to oxygen permeation, it is called a composite. The inert phase is added to improve some property of the material (mechanical resistance, for example). For example, in the composite $SrCo_{0.8}Fe_{0.2}O_{3-\delta}$—$SrSnO_3$ it comprises two perovskites where the $SrSnO_3$ phase is inert with respect to oxygen permeation, but improves the mechanical properties of the membrane. Early in the development of perovskite-type membranes, studies focused on those that included Co in the B crystalline position because Co-based membranes have high oxygen conductivity (for example, in $Ba_{0.5}Sr_{0.5}Co_{0.8}Fe_{0.2}O_{3-\delta}$). However, cations Cobalt can be easily reduced to a lower valence state due to the weak bonds of Co—O, which is unstable in reducing environments.

Therefore, Co-free perovskites have been developed. For example, $BaCe_{0.05}Fe_{0.95}O_{3-\delta}$ exhibit lower oxygen conductivities compared to the respective Co-based perovskite, but exhibit high stabilities even in $H_2$ at high temperatures.

The most common geometries are flat, tubular, and hollow fiber membranes. Finally, considering the configuration of the dense layer, we speak of self-supported membranes composed of a single membrane layer that has sufficient thickness to support the integrity of the membrane, and asymmetric when the dense membrane layers have a porous layer that allows the use of smaller thicknesses, since the integrity of the membrane is supported by the porous layer.

For practical use, oxygen separation membranes by means of high temperature ion transport, are generally made up of the following components:

(i) A porous support, generally made, either of the same material from which the separation layer is made, or of a material (ceramic or metallic) compatible with the separation layer. Compatible means that they have a similar expansion profile as a function of temperature, and that a reaction between both phases does not take place at high temperatures to give rise to third phases, which generally result in degradation and rupture of the membrane. The support porosity is usually between 20 and 60%, and its thickness is variable, typically below 2 mm.

(ii) On the porous support a non-porous layer or film is placed, preferably with a thickness less than 150 μm. This layer is made up of oxides, or mixtures of oxides, and allows the simultaneous transport of oxygen ions and electronic carriers through it.

(iii) On the non-porous layer there is adhered a porous layer with a thickness preferably between 100 and 10 μm, made of a material that has mixed ionic and electronic conductivity, as well as catalytic activity for the adsorption/desorption of oxygen and its dissociation and ionization. This catalytic layer makes it possible to improve the processes of inclusion and elimination of gaseous oxygen.

In some cases, there is an additional porous catalytic layer between the porous support and the non-porous separating layer, that has the function of improving the gas exchange steps, especially when the porous support does not possess catalytic activity nor does it allow to carry out the gas exchange transport of oxygen ions or electronic carriers. Generally, the properties of the porous support and the additional porous catalytic layer are quite similar, although generally the specific surface area of the porous support is higher.

Optionally, another additional non-porous layer (v) may also be required. This layer would be located between the non-porous layer and the porous layer, and would serve as protection of the separation layer against possible interactions or degradation reactions in contact with layer (iii), or with the operating gases in contact with the porous layer. This additional layer must allow the transport of oxygen ions and oxygen carriers while being thermo-chemically compatible with the adjacent layers and with the gases with which it is in contact.

Membrane reactor A membrane reactor is a unit that combines a reactive system with a separation process by means of a selective membrane, in order to add or remove reactants or products aiming at improving the efficiency of the system. In membrane reactors, membranes are introduced for the following purposes: selective reagent extraction, catalyst retention, reagent dosing, catalyst support. All this entails increases in the efficiency of reactions in systems limited by thermodynamic equilibrium, avoiding secondary reactions, protecting the catalyst from possible compounds that deactivate it, etc.

Oxycombustion

Oxycombustion consists of the use of a stream of high purity $O_2$ as an oxidizer instead of air, as is done in conventional combustion processes, thus achieving higher flame temperatures with less fuel consumption and thus improving combustion. The use of oxygen-rich comburent agents makes it possible to obtain combustion gases with a composition consisting mainly of $CO_2$ and water vapor. The high $CO_2$ concentration of the flue gases, in the oxy-fuel process, facilitates its potential separation. In fact, this oxy-fuel process in thermal, or energy-intensive, plants makes it possible to produce electrical energy or industrial products from fossil fuels, minimizing the emission of $CO_2$, being technologically and economically feasible thanks to its integration with capture technologies and $CO_2$ storage. These processes have high energy efficiencies, which allows reducing fuel consumption and reducing the size of industrial units and equipment. Likewise, in the case of carrying out combustion only with oxygen instead of air and not feeding $N_2$ to the furnace, reactor or boiler, it is possible to considerably reduce NOx emissions (except for the nitrogen that the combustible stream may contain). Therefore, this process has the advantage of facilitating the separation and capture of $CO_2$, which can be subsequently liquefied, transported and stored or used in other industrial processes, and minimizes $CO_2$ and NOx emissions, as well as substantially increasing energy efficiency of the process.

Examples of energy-intensive industries that require the use of oxygen are the glass industry, incinerators, manufacture of frits, enamels and paints, metallurgy, iron and steel, chemical, refining and petrochemical industries. One of the industrial sectors in which the use of oxygen makes oxy-fuel combustion possible, is glass melting and the manufacture of frits, enamels and ceramic colors. In this type of industry, the need to reach temperatures above 1500° C. inside the furnaces, in order to melt the mixture of raw materials that is introduced, is achieved by using oxygen instead of air in the natural gas burners.

Oxygen membranes can also be applied in air enrichment, so that the oxygen concentration is increased from 21% to higher values, typically above 24%. This increase in concentration is necessary in certain combustion or chemical conversion processes, wherein the calorific value of the product to be treated, generally a fuel, is insufficient to maintain adequate operating conditions. A typical example of enrichment is the use in cement plants that use alternative fuels or incinerate residues during the manufacture of clinker.

Oxy-fuel combustion aims to be one of the most economical technologies for capturing $CO_2$, its main drawback being the high demand for $O_2$ that it presents and the cost that obtaining it entails. The great challenge of this technology is in the production of $O_2$ to be able to supply the high required quantities.

Industrial Waste and Streams Discarded in Industrial Plants

Most industrial plants generate streams that are not interesting for the process. Faced with the impossibility of finding a useful application to these currents, they generally end up being burned. In most cases, the greatest revaluation that is made with these currents is to take advantage of the heat of combustion to improve the energy efficiency of the process. In petrochemical plants and refineries, many currents are generated that end up being burned, due to the fact of not having any possible application (production of $O_2$ and $N_2$).

Oxygen is an important industrial gas that is widely used in chemical industries, ferrous metallurgy, glass, clean energy generation, environmental protection, among others. At present, cryogenic distillation is the only commercialization technology for the large-scale production of pure oxygen. Over the past 100 years, cryogenic technology has gradually matured, and there is only marginal room to reduce energy consumption in the production of pure oxygen. However, the current cost of pure oxygen production is still too high to be accepted by many industrial processes, such as the clean energy generation process, that is, the oxyfuel process with $CO_2$ capture, in which the air is replaced by pure oxygen for fossil fuel combustion. Another mature technology for separating oxygen from air is pressure swing adsorption (PSA), using zeolites as adsorbents. However, the purity of oxygen produced through the PSA process is less than 95%, and it is economical only in medium or small-scale oxygen separation. Therefore, PSA technology is not suitable for the aforementioned large-scale industrial processes. Compared with cryogenic distillation technology, MIEC membrane technology for pure oxygen production has low energy consumption and less capital investment and easily integrates with large-scale industrial processes.

Nitrogen is an industrial gas widely used as an inert gas, while the oxygen that the gas may include does not represent a risk of fire, explosion or possible oxidant. In the same way as the production of oxygen, cryogenic distillation is the only way to produce it on a large scale and, for small or medium scale PSA technology can also be competitive. The use of MIEC membrane modules to produce nitrogen is possible with sufficient membrane area through oxy-combustion processes which are air defective, so that the process air is remarkably oxygen-depleted throughout the module, until reaching very low levels of it. So, in the same way as for pure oxygen production, compared to cryogenic distillation, MIEC membrane technology for pure nitrogen production has low energy consumption and less capital investment, and is easily integrated with large-scale industrial processes.

Turbomachines

Turbomachines are equipment that exchange energy between a rotor and a fluid. This energy transfer involves a change in fluid pressure and can go both ways: while turbines transfer energy from the fluid to the rotor, compressors transfer energy from the rotor to the fluid to cause changes in fluid pressure.

The main components of a turbomachine are: (i) a rotating element that carries blades that work in a fluid stream, (ii) a stationary element or elements that generally act as blades or guides so that the direction of flow and the conversion of power are properly controlled, (iii) an input and/or output shaft, and (iv) the assembly. The rotating element that carries the blades is also known by the names of rotor, runner, impeller, etc., depending on the particular application. The energy transfer occurs only due to the exchange of momentum between the flowing fluid and the rotating elements. Generally, all turbomachines are well insulated, so the processes they house work in an adiabatic regime.

For incompressible fluids (most liquid fluids) the pressurization of the fluid does not imply (significant) changes in the internal energy and, therefore, the temperature does not show changes due to the process.

For ideal gases, pressure changes in a turbomachine operating in adiabatic regime cause the process to take place isoentropically, and that the energy transferred between the rotor and the fluid generates changes in the internal energy of the fluid that result in temperature changes. Considering the first temperature law, the temperature changes in a turbomachine in adiabatic regime for an ideal gas are described by the following equation:

$$T_{end} = T_0 \cdot (p_{end}/p_0)^{\frac{\gamma-1}{\gamma}}$$

where $T_{end}$ and $T_0$ are the outlet and inlet temperatures respectively, $p_{end}$ and $p_0$ are the outlet and inlet pressures respectively, and $\gamma$ is the adiabatic expansion coefficient. Therefore, considering the process, when the turbomachine causes an increase in gas pressure, the temperature of the fluid increases and, when the turbomachine causes an expansion of the gas, the temperature decreases.

Finally, real turbomachines present losses due to the fact that the thermal insulation is not perfect and the friction of the fluid with the equipment. For this reason, in practice, turbomachinery performances are established on the ideal behavior for the complete characterization of the process. Generally, with respect to turbomachines for incompressible fluids, the process is well defined with the mechanical performance. With regard to gas turbomachines, the process is well defined with the mechanical performance and the isoentropic performance.

This equipment is used in power plants to transform heat into electrical energy because the pressurization and depressurization energy increases with temperature. To this purpose, a fluid is pressurized at low temperatures. The pressurized fluid is heated, generally from the heat of a combustion. The heated fluid is introduced into a turbine where the mechanical energy transmitted to the rotor is transformed into electrical energy. Finally, the fluid is brought to the starting conditions to close the cycle. The difference between the energy required by the system to pressurize the fluid and that obtained by depressurizing the turbine is transformed into electrical energy. This process is carried out mainly with water since it allows the pressurization to be carried out on a liquid (which is much less expensive than with a gas) and in this case it is called the Rankine power cycle. There are also many applications that use a complete gas circuit, and in this case it is called Brayton power cycle, for example, aircraft turbines that includes within the same assembly, the air compressor, the combustion zone and the turbine. These types of assemblies (compressor, combustion zone, turbine) are called gas turbines.

Heat Exchangers

Heat exchange systems are systems that allow heat exchange between at least two fluids. They are equipment widely used in cooling or heating systems, power stations, chemical plants and the petrochemical industry, among others. This equipment can be integrated into processes wherein it is required to include (or evacuate) heat to the system. They are very versatile equipment generally built using metal alloys to promote heat exchange.

The heat exchanger systems can arrange the flows of the different fluids in co-current, counter-current and in cross flow. In the co-current system the hot and cold fluid go in the same direction. In the countercurrent system, hot and cold fluid circulate through the equipment in opposite directions. In the cross flow system both flows go perpendicular directions.

A conventional plate heat exchanger is made up of a succession of thin plates that are sealed by joints. The gaskets also prevent the mixing of the fluids and establish the fluid circulation channels. The set of plates is compressed with two rigid metal plates making a distribution of parallel flows where one of the fluids circulates in the even channels, and the other fluid circulates in the odd channels. Nowadays, graphite, rubber gaskets, and gaskets from other material can be found, depending on the compatibility of the fluid to be used. The configuration of conventional plate heat exchangers is shown in FIG. 15.

U.S. Pat. No. 6,139,604 describes a process for the production of oxygen and nitrogen, from a feed gas containing a mixture of oxygen and nitrogen, which comprises: compressing the feed gas in an air compressor to produce a compressed feed gas; contacting said compressed feed gas with a cathode side of an oxygen selective ion transport membrane, said feed gas being at a first temperature, which is effective to promote pressure driven transport of elemental oxygen from said side of the cathode at an anode side of said oxygen-selective ion transport membrane, after which a nitrogen-rich gas portion remains on said cathode side; dividing said portion into a first oxygen-depleted portion in a first flow rate and a second oxygen-depleted portion in a second flow rate; recovering a high pressure nitrogen-rich product gas from said first oxygen-depleted portion; expanding said second oxygen-depleted portion in a turbine, thereby generating a combination of work and turbine exhaust of a low pressure nitrogen-rich product gas, such that said turbine provides sufficient work for the compressor; and oxygen product gas is recovered from a permeate on said anode side of said oxygen selective ion transport membrane.

US2003039608 describes a method for producing hydrogen, in which oxygen is separated from a stream containing oxygen, to produce an oxygen permeate which is mixed with a stream containing hydrocarbons and vapor. Steam, one or more hydrocarbons, and permeated oxygen are made to react to produce a synthesis gas. Hydrogen is separated from syngas by a hydrogen transport membrane to produce a hydrogen permeate which, after cooling, is used to form a hydrogen product stream. Hydrogen-depleted crude syngas is burned to heat the incoming oxygen-containing feed.

U.S. Pat. No. 5,102,432 describes a process that uses a membrane system of three or more steps, without the incorporation of a deoxo unit, to produce very high purity nitrogen product. Nitrogen is produced from air in three steps of membrane, the compressed air passes to the membrane modules, at a supply air pressure between 50 to approximately 300 psig, at a temperature of approximately 90° F. The oxygen gas selectively permeates the membrane material used in such modules and is rejected at the relatively low pressure, the permeate side of the membrane. The non-permeated nitrogen-rich gas is recovered, essentially at the high pressure of the feed air. The permeate gas from the second step, which has an oxygen concentration lower than that of air, can be recycled to the head of the plant for compression and recycling to the membrane system. Similarly, the permeated gas from the third step, which has a lower oxygen content than the one of the first step, the non-permeated gas which is fed to the second step, can be recycled to the feed to said second step.

The present invention refers to a new process that makes it possible to revalue industrial waste in order to simultaneously and separately produce at least 2 gases selected from nitrogen, oxygen, hydrogen and carbon dioxide in at least two gaseous streams with high purity, by combining different modules of oxygen permeable ceramic membranes. Therefore, the present invention provides a solution to improve the performance (permeate flow) of incomplete combustions and to revalue waste streams from a plant and transform them into products with higher added value.

The process allows the use of residual materials from different industrial processes. It is possible to treat small amounts of industrial waste (which over time pose a large residual burden for a company and the environment) or large streams that do not have an optimal treatment, by adjusting the membrane area that is required in each membrane module.

DESCRIPTION OF THE INVENTION

The present invention refers to a process that, using oxygen permeation ceramic flat membrane modules, allows the simultaneous production of at least two gases selected from practically pure nitrogen, oxygen, hydrogen and carbon dioxide in at least 2 separate streams, starting from a fuel stream and an oxygen-rich stream, which can be air or a stream of water vapor.

In this specification the expression "practically pure" means that its purity is at least 90% with respect to the total of an outlet stream, preferably 95% and more preferably 99.99%.

In this specification the terms "input stream", "gas phase fuel stream", "gasified fuel stream", "input gaseous stream" are used interchangeably.

When referring to the membrane modules "first module", "second module" and "third module" in the embodiments in which at least three modules are used, the "first module" is the module in which operations are carried out, corresponding to the first steps of the procedure, the second module is the intermediate module and the third module is the module in which operations corresponding to the last steps of the procedure are performed.

In cases where only two modules are used, they are referred to maintaining the terminology used for the embodiments of the procedure that use three modules, that is, "first and third modules" are referred to when the second is dispensed with, or one speaks of "second and third modules" when the first is dispensed with, The present invention refers to a method for generating and separating gases selectively characterized in that it comprises:
- a first step wherein an input stream, of fuel in the gaseous phase, is passed, comprising combustible substances whose oxidation gives rise to gaseous products, and an inlet stream, rich in oxygen, through at least two modules of ceramic membranes of oxygen separation, so that the two streams come into contact through the membranes and a heat exchange takes place between them,
- a second step of selective diffusion of oxygen, from the stream rich in oxygen, towards the fuel stream, and such that the output streams from the membrane modules are, on the one hand, an oxygen-depleted stream or completely oxygen-free stream and, on the other hand, a partially oxidized or completely oxidized stream,
- a third step of recovery of at least two separate outlet streams, of at least two gases selected from oxygen, nitrogen, carbon dioxide and hydrogen.

The gasified fuel stream contains combustible substances and their oxidation through reaction with oxygen produces gaseous compounds.

According to particular embodiments, the membranes are flat.

According to particular embodiments, the oxygen-rich input stream is selected from air, water vapor, and combinations thereof.

According to additional particular embodiments, in the second step the oxidation of the fuel is complete.

According to further particular embodiments, the oxygen-rich input stream is air and the two separate outlet streams are nitrogen and carbon dioxide.

According to further particular embodiments, the oxygen-rich inlet stream is air and there are at least three separate outlet streams: oxygen, nitrogen, and carbon dioxide.

According to further particular embodiments, the oxygen-rich input stream is steam and the two separate outlet streams are hydrogen and carbon dioxide.

According to further particular embodiments, the oxygen-rich stream is steam and there are at least three separate outlet streams: they are oxygen, hydrogen, and carbon dioxide.

Ceramic oxygen permeation membranes need high temperatures to achieve efficient oxygen transport ($\geq 600$, or even $\geq 650°$ C.), so the input streams to the modules (one rich in oxygen and the other one with low contents or oxygen partial pressures) must be pre-conditioned to enter the modules at temperatures greater than 600° C. To this purpose, the input streams are preferably previously heated by heat exchange devices using the hot outlet streams in order to maximize energy efficiency.

In the process of the invention, the gas exchange between the two input streams to the membrane modules is carried out at a temperature between 600° C. and 1500° C. Preferably, the gas exchange between the two input streams to the membrane modules is carried out in such a way that the temperature of the gases does not exceed 1500° C.

Oxygen diffuses preferably at temperatures comprised between 600-750° C.

Inlet streams enter the membrane modules at a temperature of 600° C. or higher.

The average operating temperature of the membrane modules is, according to particular embodiments, between 750 and 1250° C.

The method can also comprise, to improve the transport of oxygen through the membranes, a pressurization step in a first gas compressor device, of the input streams at absolute pressures between 2 and 15 bar, obtaining pressurized input streams.

The pressurization of the combustible gaseous stream by the first gas compressor must be sufficient to overcome the pressure losses due to the gas conduction lines, the heat exchanger systems and the membrane modules.

The pressurized inlet streams can be subjected to a preheating step with heat given off by the outlet streams, obtaining preheated pressurized input streams.

The flows of the combustible gaseous stream and the oxygen-rich stream can be arranged in counter-current.

The oxygen-depleted outlet stream (normally below 15% vol., but it will depend on the configuration of the plant) is preferably introduced into a turbine for its energy upgrading.

To optimize the pressurization (and depressurization) of the oxygen-rich line, the turbine will preferably be connected to the same shaft as the first gas compressor device.

According to particular embodiments illustrated in example 1, the process is carried out in at least three modules selected from:
  a first membrane module, wherein the gasified fuel stream is partially oxidized,
  a second membrane module, wherein the gasified fuel stream is completely oxidized,
  a third membrane module, wherein oxygen extraction is carried out.

In these embodiments, cross-flow, co-current flow, or counter-current flow can be used in the second membrane module.

With countercurrent flows the heat exchange is better and it is possible to achieve better temperature control and avoid very hot spots at certain points of the membrane modules, which can lead to risks of mechanical failure of the module.

In these embodiments, $CO_2$ and liquid water are produced from the oxidized combustible gaseous stream that leaves the second module, the water being condensed by means of a condenser-separator arranged at the outlet of the second module, from which two output streams emerge: an oxidized combustible gaseous stream—composed mainly by $CO_2$—and a stream of liquid water.

According to additional particular embodiments, with respect to the embodiment shown in Example 1, although they are not represented, carbon dioxide and nitrogen are obtained, and a recirculation of part of the carbon dioxide or nitrogen obtained in the process is carried out (with respect to the embodiment shown in Example 1, although said recirculation is not shown), so that a dilution of the combustible gaseous stream occurs and the oxidation heats are absorbed.

According to additional particular embodiments, illustrated by example 2, three membrane modules are used, such that
  the entire oxygen-rich input stream, coming from a second heat exchanger, is introduced into the second membrane module,
  the oxygen-depleted outlet stream from the second membrane module is metered through a system of valves that circulate this stream partially:
    to the first membrane module as a stream that supplies oxygen, as an oxygen-depleted stream containing an amount of oxygen less than the stoichiometric amount to completely oxidize the gasified fuel stream, and
    to the third membrane module as a stream that supplies oxygen to the third module and the turbine.

According to additional particular embodiments, illustrated by example 3, the second and third membrane modules are used,
  the whole gasified fuel input stream, heated pressurized, coming from the first heat exchanger, is introduced into the second membrane module, and
  the whole oxygen-rich input stream, coming from the second heat exchanger is introduced into the second membrane module.

According to additional particular embodiments, illustrated by example 4, only the first and second membrane modules are used,
  the oxygen-depleted outlet stream from the second membrane module is recirculated to the turbine as turbine input stream.

A $CO_2$ outlet stream and an oxygen-depleted outlet stream are obtained from the modules where partial oxidation occurs, and both outlet streams are pressurized after being cooled.

According to additional particular embodiments, illustrated by example 5, the first and third membrane modules are used,
  the partially oxidized fuel gas stream exiting the first membrane module and the oxygen-depleted outlet stream of the third membrane module are introduced into a combustor to finish oxidizing the combustible material of the partially oxidized gas stream, and
  the outlet stream from the combustor is introduced into the turbine.

According to additional particular embodiments, illustrated by example 6, additional membrane modules are used, in addition to the first, second and third membrane modules, in the additional modules the gas streams produced in the first membrane module and the second membrane module are purified by removing oxygen from them, and
  the combustible gaseous stream enters the additional modules as an entrainment stream.

In this case, the membrane modules may have a counter-current flow distribution to ensure complete oxygen exchange from the streams to be purified to the combustible streams.

The flue gas streams can be purified by oxygen permeation polymeric membranes, after being cooled to ambient temperature and pressurized.

In the process of the invention, the source of the combustible gasified stream can be biomass, which is gasified by means of a thermochemical reactor, the input streams to the thermochemical reactor being:
- biomass
- an entrainment stream consisting of an inert gas and, optionally, water vapor,
- and, optionally, an oxygen-rich input stream.

A particular embodiment of the process in which the gas-phase input stream comprises biomass is shown in example 7.

The process of the invention makes it possible to obtain two or more gaseous outlet streams with a purity greater than 95%, on a dry basis, of the gases selected from $N_2$, $O_2$, $H_2$ and $CO_2$.

The process of the invention makes it possible to obtain, according to particular embodiments, as different output streams, at least $N_2$ and $CO_2$ with purities greater than 95%.

The process of the invention makes it possible to obtain, according to particular embodiments, as different output streams, at least $N_2$ and $O_2$ with purities greater than 95%.

The process of the invention makes it possible to obtain, according to particular embodiments, as different outlet streams, at least $N_2$, $CO_2$ and $O_2$ with purities greater than 95%.

The process of the invention makes it possible to obtain, according to particular embodiments, at least one pressurized stream with absolute pressure greater than 4 bar, as outlet streams composed of $N_2$, $CO_2$ or $O_2$ with purities greater than 95%.

The input stream, containing combustible materials, may comprise one or more products selected among CO, $H_2$, $H_2S$, methane, liquefied petroleum gas (LPG), alcohols, olefins, peroxides, aromatic compounds, organic acids, organic amines, naphthas, asphalts, bitumen, gas oil, vegetable-, animal- or mineral oils or fats, coals, and mixtures thereof. These substances may or may not be present in the combustible stream, depending on the origin, and the treatment is the same as presented. The concentration and composition of each component only influences the oxygen requirements for complete or partial combustion (which is customized with the membrane area) and the heat produced in the exothermic reaction, which must be taken into account in the design of the system, as noted in the following paragraph.

The composition of the fuel, as well as its reaction mechanism must be considered for the design of the first and second membrane modules that receive the input currents in order to optimize heat transmission and avoid areas within each module with excessive temperatures. FIG. 12 shows the adiabatic flame temperature for different materials.

According to particular embodiments of the process, hydrogen is obtained. To obtain hydrogen, the oxygen-rich stream (C2) is a stream of water vapor or a stream of air mixed with water vapor. In this case, the oxygen-rich stream is driven by a hydraulic pump. Subsequently, an evaporator is required to gasify the oxygen rich stream and a heat exchanger to raise its temperature to the inlet temperature of the first module (which we can call the operating point). In this case, the oxygen exchanged through the membrane modules comes from the oxygen in the water molecule, producing hydrogen in the part of the module that contains the gas (or vapor chamber). If the combustible stream comprises hydrocarbons, the overall process is based on the respective steam reforming reactions of said hydrocarbons. These reactions are highly endothermic and, consequently, a decrease in temperature would occur as this process progresses which, in turn, would deactivate the phenomena of oxygen transport through the membrane. Thus, using this process to produce hydrogen requires sources of heat in the membrane modules to prevent the decrease in temperature from limiting the process. If the combustible stream is based on CO, the global reaction is water gas shift (CO+$H_2O \leftrightarrows CO_2+H$). This reaction is exothermic, so the energy dissipated in the internal temperature control of the equipment must be considered, in order to protect the installation.

In the process of the invention, the oxygen ion exchange membranes have been integrated in a process of oxidation of a combustible stream and a gaseous stream with oxygen (typically air) to simultaneously obtain at least 2 products selected from $N_2$, $O_2$, $H_2$ and $CO_2$. This process takes advantage of the heat generated in the oxidation process for the heating of the different input streams and to maintain the temperature of the different units that make up the system. Obtaining practically pure nitrogen occurs from an assembly where the fuel and air streams are in countercurrent and the air that is introduced to this assembly is less than the stoichiometric amount to oxidize all the oxidizable material in the combustible stream. The production of $CO_2$ is achieved from an assembly where the amount of oxygen exchanged is greater than the stoichiometric amount of the input fuel and after a separation of the water that may have formed in the different oxidation reactions. The production of oxygen is achieved by using the air used after having produced the $CO_2$ and $N_2$ in an assembly where the oxygen is extracted by means of a vacuum system. The different membrane assemblies for oxygen ion exchange must act as oxygen and heat exchangers and must be properly designed for the process to be efficient. The final used air can be revalued in a turbine.

The process of the invention has several advantages over the state of the art, such as the fact that it achieves three actions to take place simultaneously:
- the heat exchange that takes place in the membrane modules
- the transfer of matter that occurs and
- the reaction of oxygen with fuel.

The present invention also relates to an installation for carrying out the defined process.

When referring to the installation, the expressions "line of current"; or the terms "conduit" or "stream" are used interchangeably.

The installation to carry out the defined process comprises at least:
- two oxygen separation membrane modules
- gas compressors that drive the input currents to the membrane modules
- heat exchange devices between incoming or outgoing gaseous streams in membrane modules,
- a turbine arranged to receive at least gas from one of the membrane modules and producing work
- at least two separate individual exhaust gas streams which come from the oxygen separation membrane modules and wherein each oxygen separating membrane module comprises a set of parallel planar membranes.

These characteristics mentioned in the previous paragraph are common in the installation for all the embodiments.

The compressors allow process gases compression to absolute pressures in the range between 0.5 and 15 bar.

The objective of the turbine, or set of them, is the production of electrical and/or mechanical energy from the decompression of currents made up of hot gases from other units of the process.

The installation can additionally include at least one membrane module based on ceramic ionic and electronic conductors, and composed of parallel and flat channels that facilitate contact between gas currents isolated by the membrane and whose only input is an oxygen-rich stream, and as outputs (i) a rejection stream, depleted in oxygen with respect to the input stream, and (ii) a stream rich in oxygen with purity greater than 95% and which is under vacuum—between 1 and 750 mbar—.

The membrane modules of the installation may comprise separation membranes based on ceramic electronic and ionic conductors, and porous ceramic supports.

Furthermore, the membrane modules may comprise a catalyst for the effective oxidation of the combustible components with oxygen diffusing through the membrane.

The flow of the two streams in the membrane modules, which facilitates the exchange of matter and heat, can be carried out counter-currently and sufficient length is provided for an effective exchange.

The installation can additionally include at least one separation module based on porous polymeric or inorganic membranes selective to nitrogen diffusion and which allows a stream enriched in nitrogen to be obtained at temperatures below 400° C. from a pressurized air supply.

The installation may additionally comprise a gas and water separation unit.

In the installation of the invention, at least one compressor and one turbine can be axially coupled to use the mechanical energy of the expansion in the compression of a gaseous stream. The coupling can be carried out by means of axial turbine-compressors or turbo-compressor type systems.

According to particular embodiments illustrated in FIG. 1, the installation comprises at least:
a first module of oxygen separation membranes, which has two inlets for
   a first gasified fuel stream and
   an oxygen-rich input stream,
a first gas compressor allowing the combustible gaseous stream to be pressurized, and that leaves the compressor as a pressurized combustible gaseous stream, towards
a first heat exchanger device that allows the pressurized combustible gaseous stream to be heated and that leaves the exchanger as a preheated pressurized combustible gaseous stream
a second gas compressor that allows the oxygen-rich input stream to be pressurized, leaving the compressor as a pressurized oxygen-rich input stream,
a turbine arranged to receive at least gas from one of the membrane modules and produce work
a countercurrent gas heat exchanger device that allows heating:
   the oxygen-rich input stream pressurized to the input temperature to the first membrane module, and that exits the heat exchanger as a heated pressurized oxygen-rich input stream,
   and an oxygen-depleted stream coming from a turbine
at least two separate individual gas output streams coming from a second and a third oxygen separation membrane modules
and wherein each oxygen separating membrane module comprises a set of parallel planar membranes.

According to additional particular embodiments illustrated in FIG. 2, the installation comprises three membrane modules and in which the output stream of the second membrane module is separated into three streams, each one comprising a metering valve, and two of the streams lead to the first module or the turbine allowing gas recirculation, and the third stream leads to the third membrane module, allowing the process to advance.

According to additional particular embodiments illustrated in FIGS. 3, 4, 5 the installation comprises two membrane modules.

According to additional particular embodiments illustrated in FIGS. 6 and 7, the installation comprises more than three membrane modules.

Throughout the description and the claims, the word "comprise" and its variants are not intended to exclude other technical characteristics, component additives or steps. For those skilled in the art, other objects, advantages, and characteristics of the invention will emerge in part from the description and in part from the practice of the invention. The following examples are provided by way of illustration and are not intended to be limiting of the present invention.

BRIEF DESCRIPTION OF THE FIGURES

FIG. 10a is a perspective view of an oxygen permeation membrane module of three passages, with 6 membranes per passage.

FIG. 10b is a plan view of the oxygen permeation membrane module in FIG. 10a.

FIG. 10c is a sectional view of the oxygen permeation membrane module taken at A-A in FIG. 10b for co-current flow distribution.

FIG. 10d is a sectional view of the oxygen permeation membrane module taken at B-B in FIG. 10b for co-current flow distribution.

FIG. 10e is a partial sectional view of the oxygen permeation membrane module illustrating the highlighted portion of FIG. 10c.

FIG. 10f is a partial sectional view of the oxygen permeation membrane module illustrating the highlighted portion of FIG. 10d.

FIG. 10g is a sectional view of the oxygen permeation membrane module taken at A-A in FIG. 10b for counter-current flow distribution.

FIG. 10h is a sectional view of the oxygen permeation membrane module taken at B-B in FIG. 10b for counter-current flow distribution.

FIGS. 11a-11f show the results of example 1 where a practical case of the first membrane module (6) has been studied with a mixture of CO—$CO_2$ as a combustible gaseous stream and air as an oxygen-rich stream. Temperature profiles (T) and molar fraction of oxygen ($Xo_2$) along the air chamber (L: longitudinal coordinate of the membrane module) for the oxygen permeation membrane module with oxygen deficit in the air stream (7) for different dilutions $CO_2$ of the stream (7) with $$CO_2 r = \frac{CO2}{C1}.$$

Results for a membrane module of a total membrane area of 380 $cm^2$ and a supply of CO and $CO_2$ (57.1% CO) for stream (5) with the input streams at 700° C.

FIG. 11a is a block diagram representation of the first membrane module.

FIG. 11b is a simplified view of the passage of the gas streams through the fuel (69) and (air (71) chambers for co-current flow configuration.

FIG. 11c is a simplified view of the passage of the gas streams through the fuel (69) and (air (71) chambers for counter-current flow configuration.

FIG. 11d is a graphical representation of the results for an air input at 25% of the stoichiometric amount.

Figure 11E:
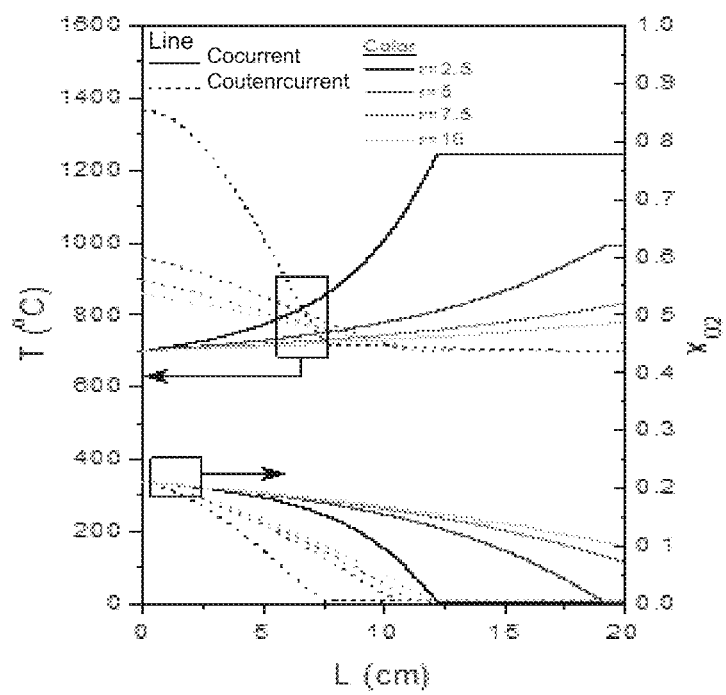

FIG. 11e is a graphical representation of the results for an air input at 50% of the stoichiometric amount.

Figure 11F:
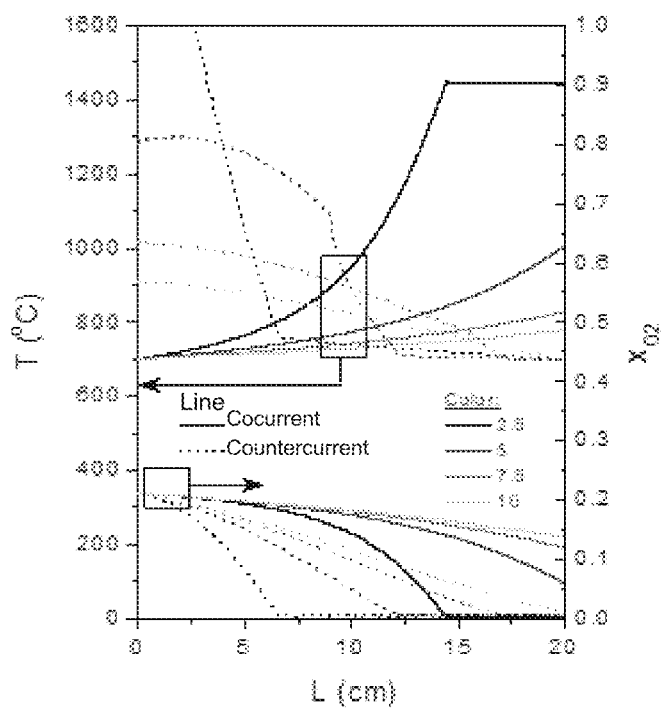

FIG. 11f is a graphical representation of the results for an air input at 75% of the stoichiometric amount.

Figure 12:
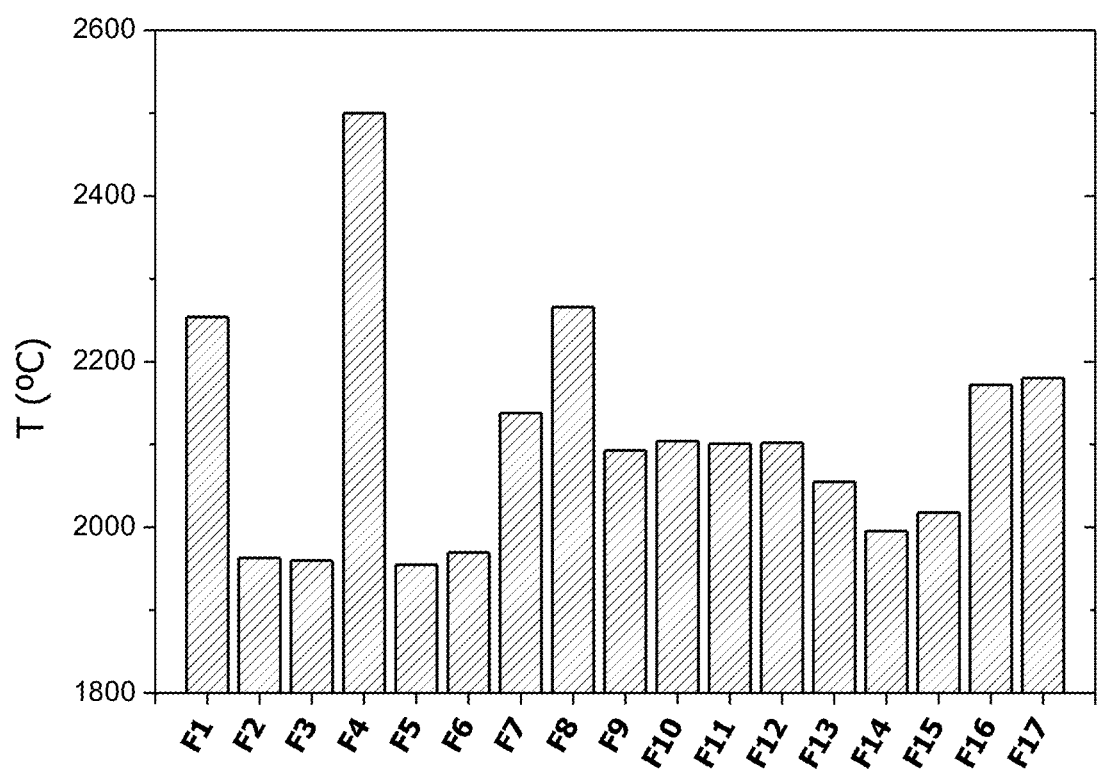

FIG. 12. Adiabatic flame temperature (T) for various fuels with air. They are important to understand the process mechanism and the results. F1: hydrogen, F2: methane, F3: natural gas, F4: acetylene, F5: ethane, F6: butane, F7: gasoline, F8: benzene, F9: kerosene, F10: light diesel, F11: medium diesel, F12: heavy diesel, F13: naphthalene, F14: pentadecane, F15: eicosan, F16: bituminous coal, F17: anthracite. (https://www.englneeringtoolbox.com/adlabatlc-flame-temperature-d_996.html).

Light gas oil is defined as a by-product obtained from atmospheric distillation of petroleum that starts boiling between 175 and 200° C. and ends between 320 and 350° C.

Medium gas oil: intermediate is defined as a by-product obtained from the distillation of petroleum, which boils within a range comprised between the boiling point of light gas oil and the boiling point of heavy gas oil.

Heavy gas oil is defined as the residual product of petroleum distillation, whose boiling range is between 423 and 600° C.

FIGS. 13a-13e show temperatures (T) for the oxygen permeation membrane module fed with different amounts of air (excess air to cause complete oxidation of the fuel). A represents the ratio between the introduced air (11) (oxygen rich stream) and the stoichiometric air to oxidize all the combustible material in the combustible gas stream (8). Results for a membrane module with a total membrane area of 380 $cm^2$ and a CO and $CO_2$ feed (9.5% CO) for (11) (oxygen rich stream) with the input streams at 700° C. The dots within the graphs indicate the cases where complete oxidation of the input fuel is achieved.

Figure 13A:
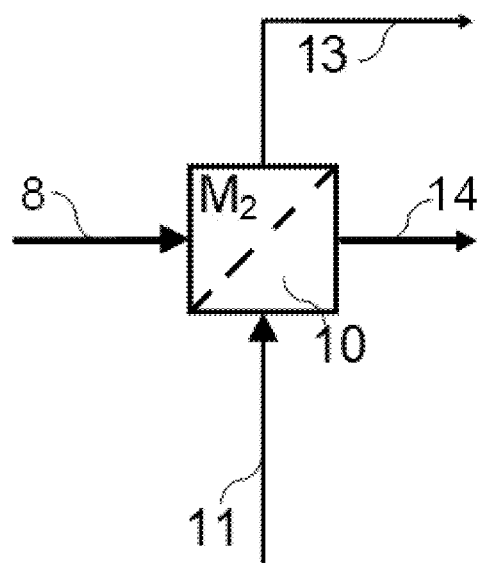

FIG. 13a is a block diagram representation of the second membrane module.

Figure 13B:
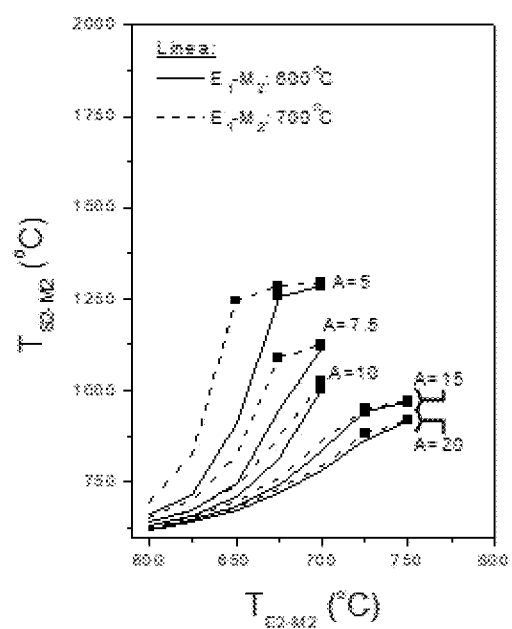

FIG. 13b is a graphical representation of the air output temperatures for co-current flows (14) (oxygen depleted stream).

Figure 13C:
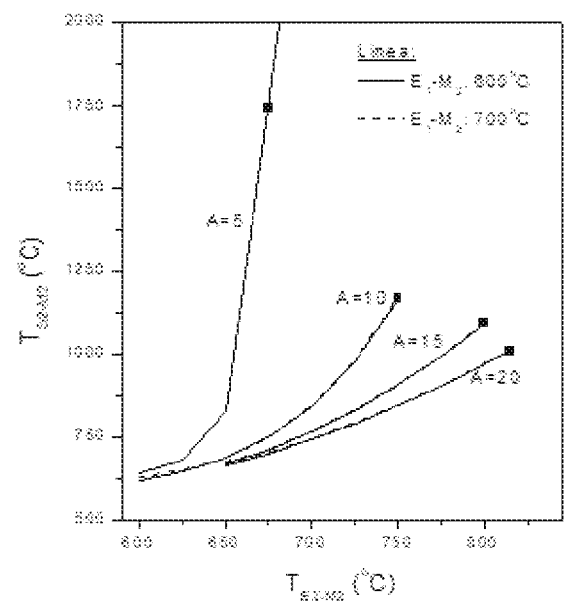

FIG. 13c is a graphical representation of the air output temperatures for countercurrent flows (14).

Figure 13D:
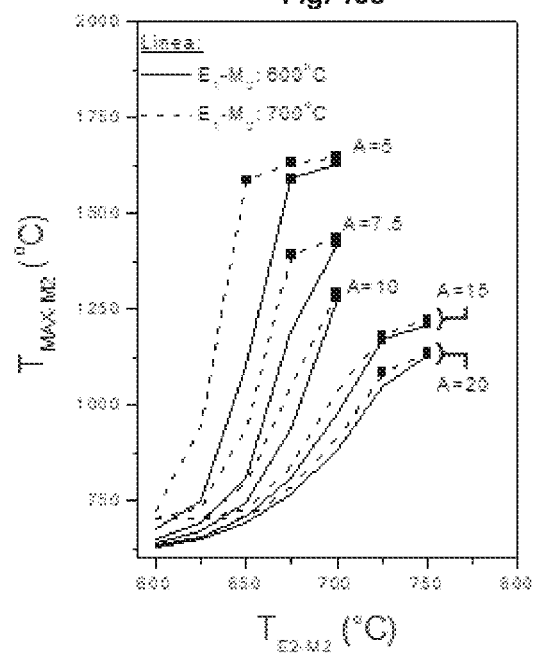

FIG. 13d is a graphical representation of the maximum temperatures inside the module for co-current flows (10).

Figure 13E:
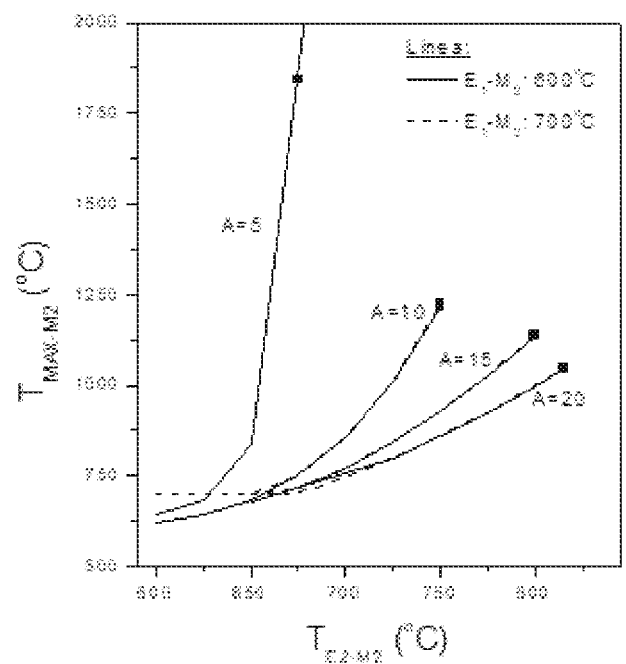

FIG. 13e is a graphical representation of the maximum temperatures inside the module for countercurrent flows (10).

FIGS. 14a-14g show oxygen extracted depending on the process conditions and the membrane area (A) used for the third membrane module. The extraction of oxygen ($E_{O2}$) was calculated by means of the ratio of oxygen extracted to oxygen entering the membrane module. Air input 22.4 $m^3_{CN}$/h (CN: normal conditions).

Figure 14A:
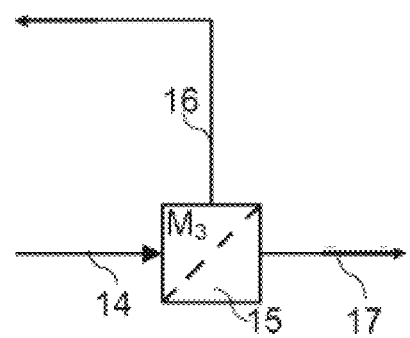

FIG. 14a is a block diagram representation of the third membrane module.

FIG. 14b is a graphical representation of process conditions with 50 mbar of vacuum pressure and air at atmospheric pressure.

FIG. 14c is a graphical representation of process conditions with 50 mbar of vacuum pressure and air at 2.5 bar.

FIG. 14d is a graphical representation of process conditions with 50 mbar of vacuum pressure and air at 5 bar.

FIG. 14e is a graphical representation of process conditions with 100 mbar of vacuum pressure and air at atmospheric pressure.

FIG. 14*f* is a graphical representation of process conditions with 100 mbar of vacuum pressure and air at 2.5 bar.

FIG. 14*g* is a graphical representation of process conditions with 100 mbar of vacuum pressure and air at 5 bar.

Figure 15:
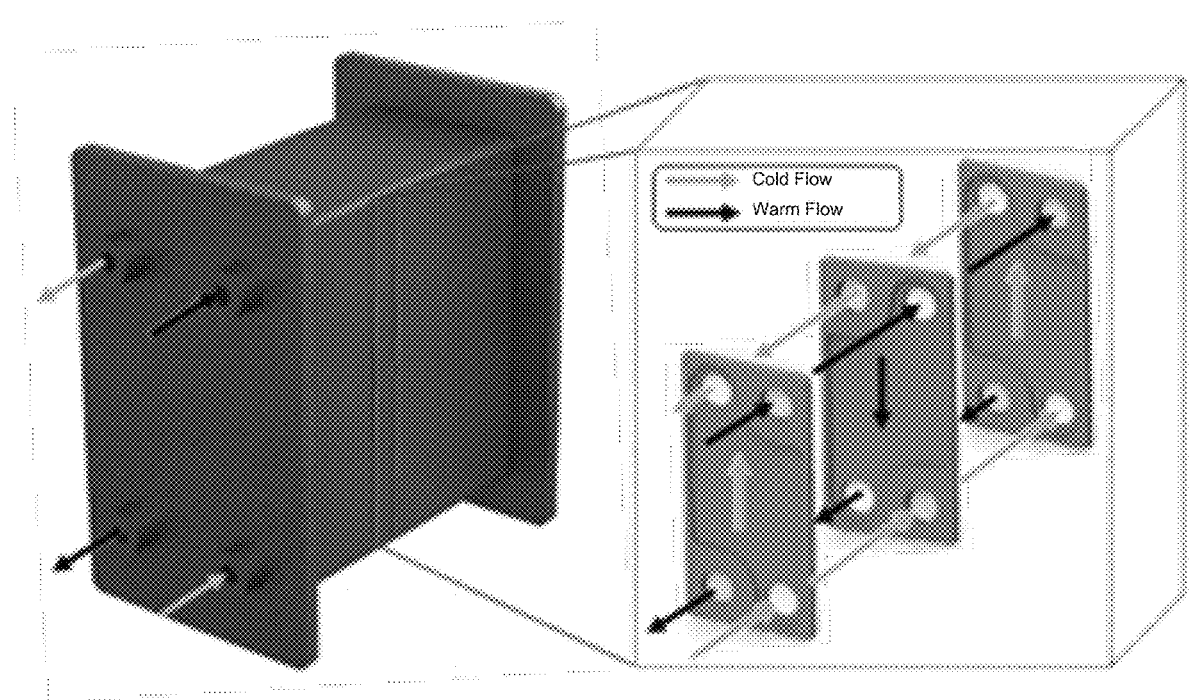

FIG. 15. Conventional configuration of a flat plate heat exchanger.

EXAMPLES

FIGS. 1 to 7 show examples of various embodiments for the process and installation of the invention.

All embodiments of the installation of the invention use the same references for the elements common to all of them, which are detailed below:

The installation has two main conduits or input streamlines: an input material stream—combustible gaseous stream—(C1) and an oxygen rich stream (C2).

The installation has several outlet conduits or lines: the oxygen-depleted stream (C3) and each of the gaseous streams that are obtained depending on the process application.

The combustible gaseous stream (C1) is driven by a first gas compressor (2).

The input stream to the first compressor (2) is the input combustible gaseous stream (1). The output stream of the first compressor (2) is the pressurized fuel gas phase stream (3).

The pressurized combustible gaseous stream (3) is heated until the input temperature, to the membrane modules by means of a first heat exchanger device (4).

The input stream to the first heat exchanger (4) is the combustible gaseous stream (3) coming from the first compressor (2).

The output stream of the first heat exchanger system (4) is the preheated pressurized combustible gaseous stream (5).

The oxygen-rich stream (C2) (27) is driven by a second gas compressor (28).

The input stream to the second compressor (28) is the oxygen rich input stream (27).

The output stream from the second compressor (28) is the pressurized oxygen-rich input stream (30).

The pressurized oxygen-rich stream (30) is heated until the input temperature of the membrane modules by means of a gas heat exchanger (31).

The input streams to the heat exchanger device (31) are the oxygen-rich stream (30) coming from the compressor (28) and an oxygen-depleted stream (32) coming from the turbine (33).

One of the output streams of the heat exchanger system (31) is the oxygen-depleted stream (C3), which reaches the outlet through streamline (35). One of the output streams of the heat exchanger system (31) is the oxygen-rich stream (34) To optimize the pressurization (and depressurization) of the oxygen-rich line, the compressor (28) and the turbine (33) can be connected to the same shaft (29).

Example 1

Figure 1:
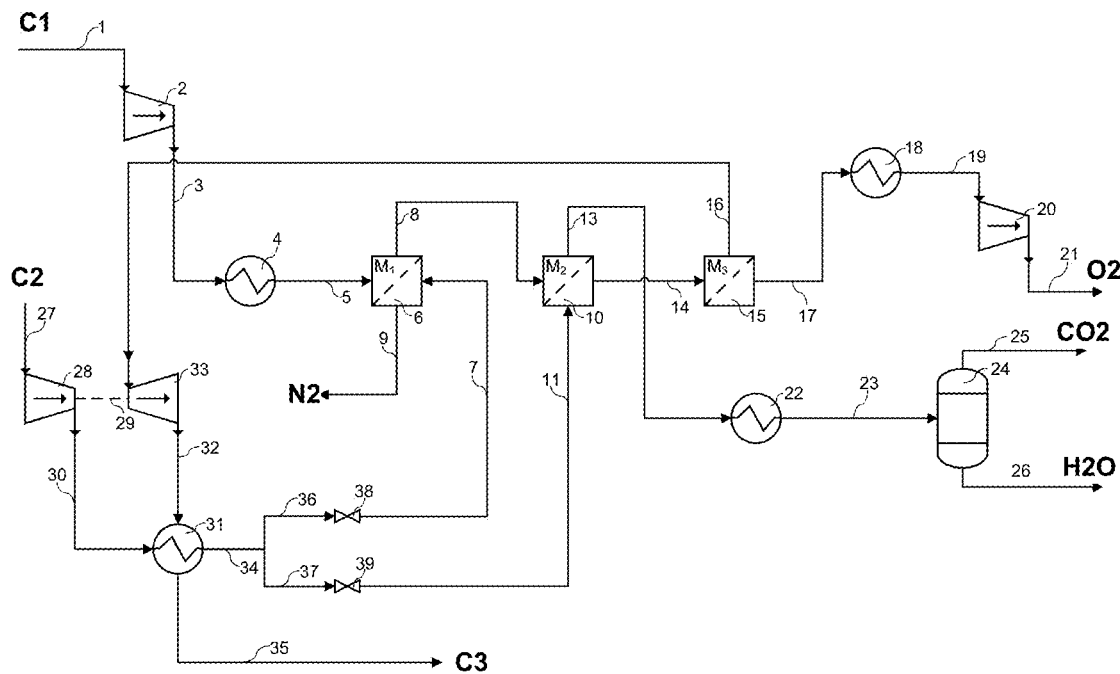
FIG. 1. Diagram of the upgrading process of industrial streams from oxygen permeation ceramic membrane modules for the simultaneous production of $CO_2$, $N_2$ and $O_2$.

FIG. 1 shows a diagram of a particular example of the process and the installation to carry it out.

The installation has in this particular case three main oxygen permeation ceramic membrane modules ($M_1$, $M_2$ and $M_3$), also designated as (6), (10) and (15). These modules have parallel flat membranes whose total area is distributed in different sections within each module. The arrangement of the streams, the geometry of the module, and the trajectory of the streams of each module are focused to optimize the process it houses and to optimize the heat transfer between the different streams that pass through it.

The input material stream (C1) (gasified stream, or fuel gas phase stream) contains combustible substances whose complete oxidation by reaction with oxygen produces gaseous compounds. The oxygen-rich input stream (C2) is composed primarily of $O_2$ and $N_2$.

The combustible gaseous stream (3) is heated until the input temperature to the first membrane module (6) by the first heat exchanger device (4). The input stream to the heat exchanger (4) is the combustible gaseous stream (3) coming from the compressor (2). The output stream of the heat exchanger (4) is the heated pressurized combustible gaseous stream (5).

The oxygen-rich stream (C2) (30) is heated until the input temperature of the $M_1$ module by means of a second heat exchanger (31). The input streams to the heat exchanger (31) are the oxygen-rich stream (30) coming from the compressor (28) and the oxygen-depleted stream (32) coming from the turbine (33). In this case there are two output streams from the second heat exchanger system (31), which are an oxygen-rich stream (34) and the oxygen-depleted output stream (35).

The metering or control of the volumetric flow of the incoming and outgoing gaseous streams to the oxygen permeation membrane modules (6) and (10) is carried out by means of a valve system (38 and 39). This dosage must be carried out considering that a quantity of air containing oxygen quantities less than the stoichiometric quantity is introduced to the first membrane module (6) to completely oxidize the fuel gas, while a quantity of air containing an excess of oxygen with respect to the stoichiometric quantity is introduced to the second membrane module (10). Consequently, the heated oxygen-rich stream (34) is divided into two streams (36 and 37). The input stream to the metering valve (38) of the first membrane module (6) is an oxygen-rich stream (36). The output stream from the metering valve (38) of the first membrane module is an oxygen-rich stream (7). The input stream (37) to the metering valve (39) of the second membrane module (10) is an oxygen-rich stream (37). The output stream from the metering valve (39) of the second membrane module (10) is an oxygen-rich stream (11).

The first membrane module (6) is intended to produce—according to this particular embodiment—nitrogen from the combustible gaseous stream and an oxygen-rich stream. The input streams to the membrane module (6) are the combustible gaseous stream (5), which comes from the exchanger (4) and the oxygen-rich stream (7) which comes from the metering valve (38). The output streams from the membrane module (6) are the partially oxidized combustible gasified stream (8) and the oxygen-depleted stream (9) whose composition is practically pure $N_2$. In this embodiment of the process, the oxygen-rich stream (7) is introduced in an amount less than the minimum amount to oxidize all the combustible material carried by the combustible gaseous stream (5). Considering that an amount of oxygen less than the stoichiometric amount of the combustible gaseous stream (5) has been introduced, the chamber of the combustible gaseous stream will maintain a very low oxygen pressure (of the order of mbar) and, therefore, the driving force of the oxygen transport process will be very high. In this module (6) it must be ensured that the outgoing oxygen-depleted stream (9) is practically pure nitrogen and that the heat transfer between the streams that pass through the module is efficient. For this purpose, the input streams to the $M_1$ module (6) (the combustible gaseous stream (5) and the air stream (7)) are arranged in counter-current. The oxygen exchanged through the membrane reacts with the combustible material by increasing the temperature, thereby improving the oxygen transport properties of the material. If necessary and in order to avoid excessive heating due to the oxidation of combustible gases, it is possible, optionally, to recirculate part of the carbon dioxide or nitrogen obtained in the process and thus dilute the combustible gaseous stream (5) and absorb the oxidation heat. Considering that the combustible material of the combustible gaseous stream (5) has a composition of CxHyOz, the maximum nitrogen production that could be achieved is $$\frac{2x+y/2-z}{2} \cdot \frac{0.79}{0.21}$$

mole of $N_2$ for each mole of combustible material. The variables x, y, z can take any value that is technically possible.

The second membrane module (10) is intended to completely oxidize the combustible gaseous stream (8) that leaves the first membrane module (6) partially oxidized. For this purpose, an excess (in flow rate) of the oxygen rich stream with respect to the minimum amount to oxidize all the combustible material carried by the combustible gaseous stream (8), is introduced into the process. The input streams to the second membrane module (10) are the combustible gaseous stream (8), which comes from the outlet of the first membrane module (6), and the oxygen-rich stream (11). The output streams from the second membrane module (10) are the combustible gaseous stream (13), which is mainly composed of $CO_2$ and water vapor (unless the combustible material of the gasified stream be CO, in which case the output combustible gaseous stream will be composed mostly of $CO_2$), and the oxygen stream (14), depleted in oxygen with respect to C2. The oxygen exchanged through the membrane reacts with the combustible material increasing the temperature, thereby improving the oxygen transport properties of the material. The amount of air introduced into the second module (10) $M_2$ must be high enough to ensure that the exchanged oxygen causes complete combustion of all the combustible material contained in the combustible gaseous stream (i.e., that at the outlet of $M_2$ the hydrocarbon and carbon monoxide content of this stream is negligible) and to avoid excessive heating of the module due to combustion processes, through a dilution effect and heat distribution in a large volumetric flow rate. Finally, for this module (10) the gases can be distributed in cross flows, in co-current flows or in countercurrent flows. The final choice of the module is subject to the needs: for example, considering that oxidation processes can generate excessive temperatures within the module, a co-current distribution may be necessary to allow a more gradual dosage of the oxygen exchanged by the membranes of the module and, in this way, reduce and control the progress of oxidation reactions to avoid excessive temperature increases.

The third membrane module (15) is intended to extract oxygen from an oxygen-rich stream. The input stream to the membrane module (15) is the oxygen-depleted stream (14) relative to the stream (C2) coming from the second membrane module (10). The output streams from the third membrane module (15) are the oxygen-depleted stream (16) and the extracted oxygen (17). The oxygen is extracted by imposing a vacuum in the entrainment chamber and thus achieving a high driving force. As no additional phenomena occur, this module works isothermally as long as it is well thermally insulated.

The completely oxidized combustible gaseous stream (13) coming from the second membrane module (10) is mainly composed of carbon dioxide and water vapor. For the separation thereof, the water vapor is condensed by cooling the stream to room temperature (15-25° C.). A heat exchanger device (22) is used for this purpose. The input stream to the heat exchanger system (22) is the completely oxidized combustible gaseous stream (13) coming from the second membrane module (10). The output stream to the heat exchanger system (22) is the completely oxidized combustible gaseous stream (23).

A condenser-separator (24) is optionally used to evacuate the condensed liquid water from the completely oxidized combustible gaseous stream (23) coming from the third module (15) and which has passed through the heat exchanger (22). The input stream to the condenser-separator (24) is the completely oxidized combustible gaseous stream (23) that comes from the heat exchanger device (22). The output streams of the condenser-separator (24) are the completely oxidized combustible gaseous stream (25), mainly composed of $CO_2$, and a liquid water stream (26).

Alternatively, in the case where the starting combustible gaseous stream (C1) is a mixture of CO and $CO_2$, the completely oxidized combustible gaseous stream (13) coming from the second membrane module (10) will be composed mainly of $CO_2$, thus that the separator condenser (24) is not needed and the output stream (23) of the heat exchanger device (22) would be the final $CO_2$ stream.

The oxygen stream (17) extracted from the third module (15) must be cooled before being introduced into a vacuum generation system (20). For this purpose, a device with at least one heat exchanger (18) is required to lower the temperature of the oxygen stream to approximately room temperature. The input stream to the heat exchanger device (18) is the oxygen stream (17) that comes from the outlet of the third membrane module (15). The output stream of the heat exchanger device (18) is an oxygen stream (19). Finally, the vacuum generation unit (20) drives the oxygen and pressurizes it, inducing a depression or vacuum upstream. The input stream for the vacuum generation system (20) is the oxygen stream (19) that comes from the heat exchanger device (18). The output stream for the vacuum unit (20) is the oxygen stream at the required service pressure.

Finally, the oxygen-depleted stream (16) is introduced into a turbine (33) for its energy upgrading. The outlet stream from the turbine (33) is the oxygen-depleted stream (32) that comes from the third membrane module (15). To optimize the pressurization (and depressurization) of the oxygen-rich line, the compressor (28) and the turbine (33) can be connected to the same shaft (29).

FIG. 11 shows the results of this embodiment relative to the first membrane module (6) with a mixture of CO—$CO_2$ as combustible gaseous stream (5) and air as oxygen-rich stream (7). FIG. 11.a shows a view of the first membrane module. FIGS. 11.b and 11.c show a simplified view of the passage of gas streams through fuel (69) and air (71) chambers for a co-current flow distribution (solid lines in FIGS. 11. d, 11.e and 11.f) and countercurrent (dashed lines in FIGS. 11.d, 11.e and 11.f) respectively. FIG. 11.d shows the results of the temperature profiles in the air chamber (71) and the molar fraction of oxygen in the air chamber (71) along the longitudinal coordinate of the membrane module considering an air inlet (7) corresponding to 25% of the minimum amount to achieve oxidation of all the combustible material of the input fuel gas stream (5). FIG. 11.*e* shows the results of the temperature profiles in the air chamber (71) and the oxygen molar fraction in the air chamber (71) along the longitudinal coordinate of the membrane module considering an air inlet (7) corresponding to 50% of the minimum amount to achieve oxidation of all the combustible material in the input fuel gas stream (5). FIG. 11.*f* shows the results of the temperature profiles in the air chamber (71) and the oxygen molar fraction in the air chamber (71) along the longitudinal coordinate of the membrane module considering an air inlet (7) corresponding to 75% of the minimum quantity to achieve oxidation of all the combustible material in the input fuel gas stream (5). The results show that, for the cases considered by example 1, considering a total fixed membrane area, for the first membrane module (6) the countercurrent flow arrangement allows to generate nitrogen streams whose oxygen content is less than 1%, while in the co-current case, diluting excessively the fuel stream (5) causes the module not to heat efficiently and, therefore, oxygen does not permeate because the membrane resistance acts as a limiting factor. It is observed that in the co-current case, as the oxidation reactions take place, the heat is used to heat both the CO—$CO_2$ stream and the air stream. On the other hand, oxygen is consumed in the same direction, such that for the co-current case, the temperature increases as the driving force decreases and, due to this, the phenomena of oxygen transport through the membrane is activated as the driving force decreases. On the other hand, in the countercurrent case, the direction of the fuel causes the heating of the module to occur in the opposite direction in which the driving force decreases.

This means that the hottest areas and the areas with the greatest driving force are in the same area of the module. Consequently, for countercurrent distribution, the oxygen transport phenomena through the membrane are activated as the driving force increases.

FIG. 13 shows the results of example 1 where a practical case of the second membrane module (10) has been studied with a mixture of CO—$CO_2$ as combustible gaseous stream (8) and air as oxygen-rich stream (11). A practical case has been studied for the arrangement of flows in co-current (FIGS. 13.*b* and 13.*d*) and counter-current (FIGS. 13.*c* and 13.*e*) in the second membrane module (10). FIGS. 13.*b* and 13.*c* show the temperatures of the outlet air stream (14) (oxygen depleted stream) as a function of the air stream input temperature (11). FIGS. 13.*d* and 13.*e* show the maximum temperatures inside the module as a function of the air stream input temperature (14) (stream depleted in oxygen). The results show that, for the cases considered in example 1, considering the total fixed membrane area, for the second membrane module (10) to achieve complete oxidations of the waste stream without reaching excessive temperatures that could degrade the module, requires introducing high air excess and high input temperatures.

FIG. 14 shows the results of example 1 where a practical case of the third membrane module (15) has been studied. Air has been considered as the oxygen rich stream (14). The results show that, for the assumptions considered in example 1, the pressure of the input air stream to the third membrane module and the imposed vacuum significantly improve the extraction of oxygen by reducing the membrane area required for the process.

Example 2

Figure 2:
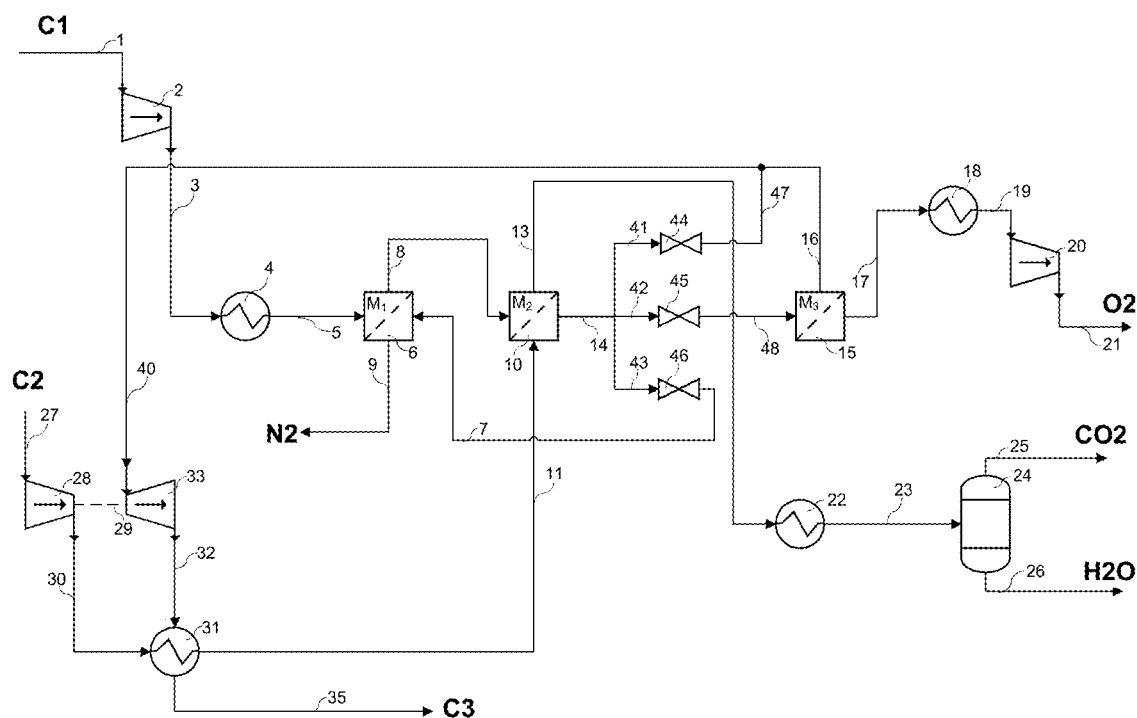
FIG. 2. Diagram of the revaluation process of industrial streams from oxygen permeation ceramic membrane modules for the simultaneous production of $CO_2$, $N_2$ and $O_2$, in an alternative configuration of the C2 stream.

A second alternative of the process according to the invention is shown in FIG. 2.

This variant of the process presents an alternative in terms of the dosage of the oxygen rich stream in the modules $M_1$ and $M_2$. In this case, the oxygen-rich stream (11) in the heat exchanger device (31) is introduced into the second membrane module (10). The oxygen-depleted stream (14) leaving the second membrane module (10) is metered by a metering valve system (44, 45 and 46) to recirculate this stream from the first membrane module (6), to the third module membrane (15) and the turbine (33). So, the depleted oxygen stream (14) that comes from the second membrane module (10) is divided into three streams (41, 42 and 43) that are introduced into the metering valves. The input stream to the first metering valve (44) is a fraction of the depleted air stream (41). The input stream to the second metering valve (45) is a fraction of the depleted oxygen stream (42) with respect to (C2) and the output stream is the oxygen-rich stream (48) entering the third membrane module (15). The oxygen-depleted stream (16) coming from the third membrane module (15) and the output stream from the first metering valve (47) are joined and introduced into an oxygen-depleted stream (40) that is introduced into the turbine (33). The input stream to the third metering valve (46) is a fraction of the oxygen-depleted stream (43) coming from the second membrane module (10). The output stream from the third metering valve is the oxygen-rich stream (7) entering the first membrane module. This stream (7), as in the case of example 1, must contain an amount of oxygen less than the stoichiometric amount to completely oxidize the combustible stream (5), it is supplied to the third membrane module (15) as stream (48) which supplies oxygen to the module (15) and to the turbine (33). In this way, the metering of the metering valves (44, 45, and 46) is carried out considering that the depleted oxygen output stream (9) must be practically pure $N_2$ and the amount of oxygen (21) that is desired to be produced.

Example 3

Figure 3:
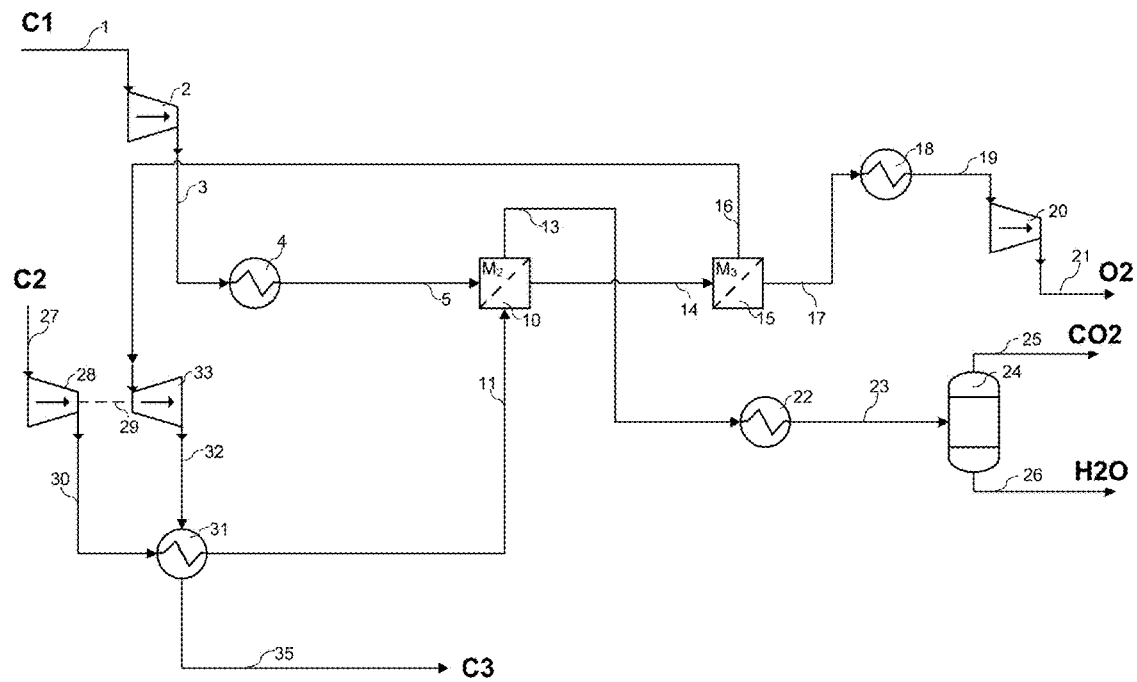
FIG. 3. Diagram of the upgrading process of industrial streams from oxygen permeation ceramic modules for the simultaneous production of $CO_2$ and $O_2$.

FIG. 3 shows a particular example of a process according to the invention, an alternative to the process for producing $O_2$ and $CO_2$. In this case, the first membrane module is dispensed with, with respect to the first two examples (FIG. 1 and FIG. 2). It is observed that the combustible gaseous stream (5) leaving the first heat exchanger (4) is the input stream to the second membrane module (10). In this case all the heated oxygen-rich stream (11) in the second heat exchanger system (31) is introduced into the second membrane module (10).

Example 4

Figure 4:
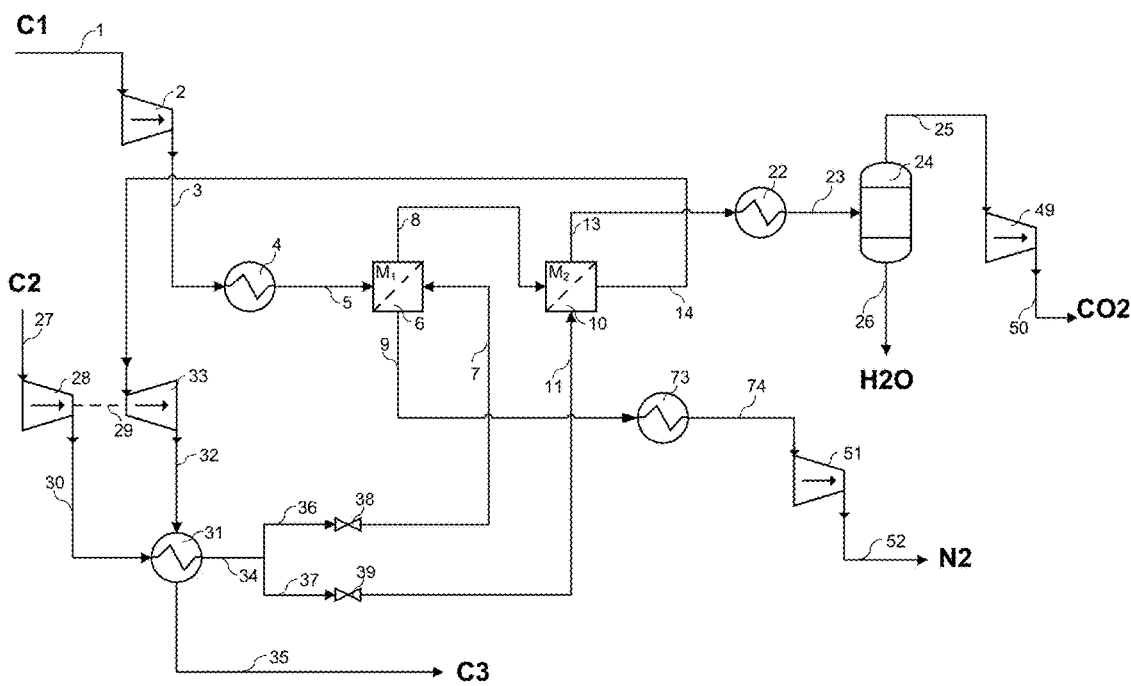
FIG. 4. Diagram of the upgrading process of industrial streams from oxygen permeation ceramic modules for the simultaneous production of $CO_2$ and $N_2$.

FIG. 4 shows a particular example—with possible variants, as read at the end of the paragraph—of a process according to the invention to produce $N_2$ and $CO_2$. It is observed that in this case the third membrane module is dispensed with, with respect to the first two examples (FIG. 1 and FIG. 2). It is observed that the oxygen-depleted output stream (14) from the second membrane module (10) is recirculated to the turbine (33) as an input stream.

Additionally, depending on the final application of the gaseous streams obtained, the process can optionally incorporate a pressurization system for the different streams that are produced as shown in the figure. Therefore, a variant of this embodiment would be an embodiment in which the nitrogen and carbon dioxide streams obtained are not pressurized and therefore the compressors (49) and (51) would not be present.

In the case that the stream is pressurized, for the $CO_2$ pressurization system (49), the input stream is the $CO_2$ stream (25) that comes from the condenser-separator (24) and the output stream is a $CO_2$ stream (50) at the required operating pressure. The nitrogen (9) (oxygen depleted stream) that leaves the first membrane module (6) is cooled to practically room temperature by means of a heat exchanger (73), from which it leaves as an $N_2$ stream (74). Finally, a $N_2$ pressurization system (51) is provided. The input stream to this pressurization system (51) is the $N_2$ stream (74) leaving the heat exchanger (73). The output stream of the $N_2$ pressurization system (51) is the $N_2$ stream (52) at the required operating pressure.

Dosing or volumetric flow control of the incoming and outgoing gaseous streams to the oxygen permeation membrane modules (6) $M_1$ and $M_2$ (10) is carried out by means of a system of valves (38 and 39) as in Example 1.

Example 5

Figure 5:
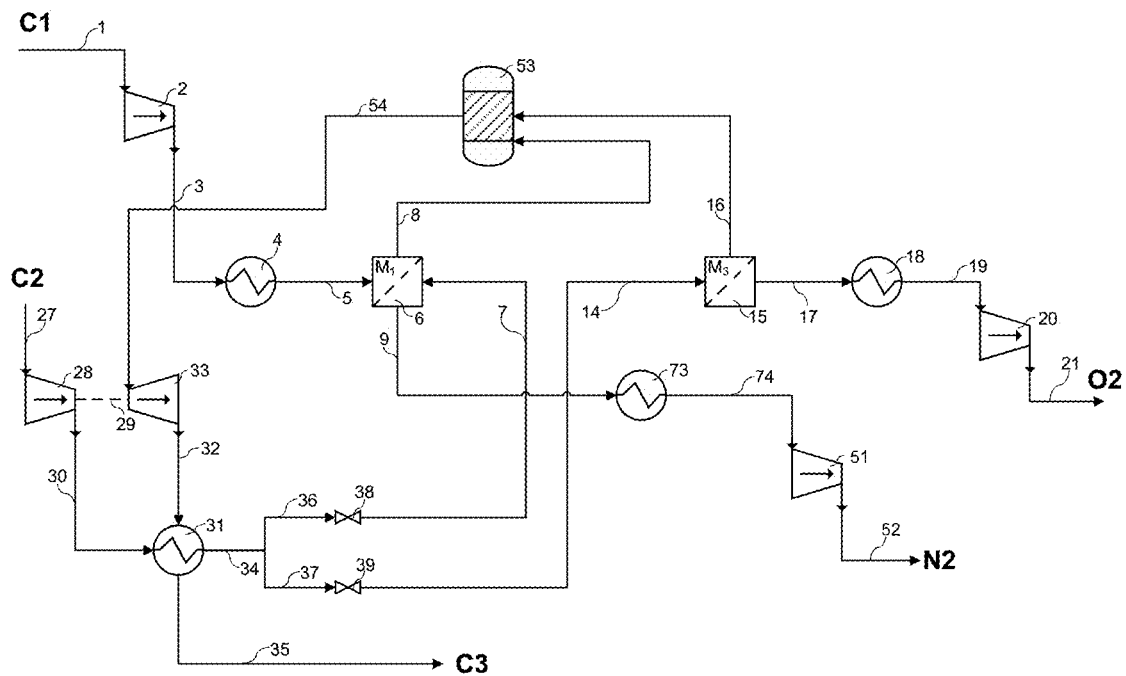
FIG. 5. Diagram of the upgrading process of industrial streams from oxygen permeation ceramic modules for the simultaneous production of $N_2$ and $O_2$.

FIG. 5 shows a particular example of a process according to the invention to produce $N_2$ and $O_2$. In this case, the second membrane module is dispensed with, with respect to the first two examples (FIG. 1 and FIG. 2). The partially oxidized combustible gaseous stream (8) leaving the first membrane module (6) and the oxygen depleted rich stream (16) leaving the third membrane module (15) are introduced into a combustor (53) to finish the oxidization of the fuel material of the partially oxidized fuel gas stream. The output stream from the combustor (54) is introduced into the turbine (33).

Dosing or volumetric flow control of the incoming and outgoing gaseous streams to the oxygen permeation membrane modules $M_1$ and $M_2$ is carried out by means of a system of valves (38 and 39) as in the case of example 1.

The nitrogen (9) (oxygen-depleted stream) that leaves the first membrane module (6) is cooled and pressurized in the same way and with the same components that are used in example 4, shown in FIG. 4.

Example 6

Figure 6:
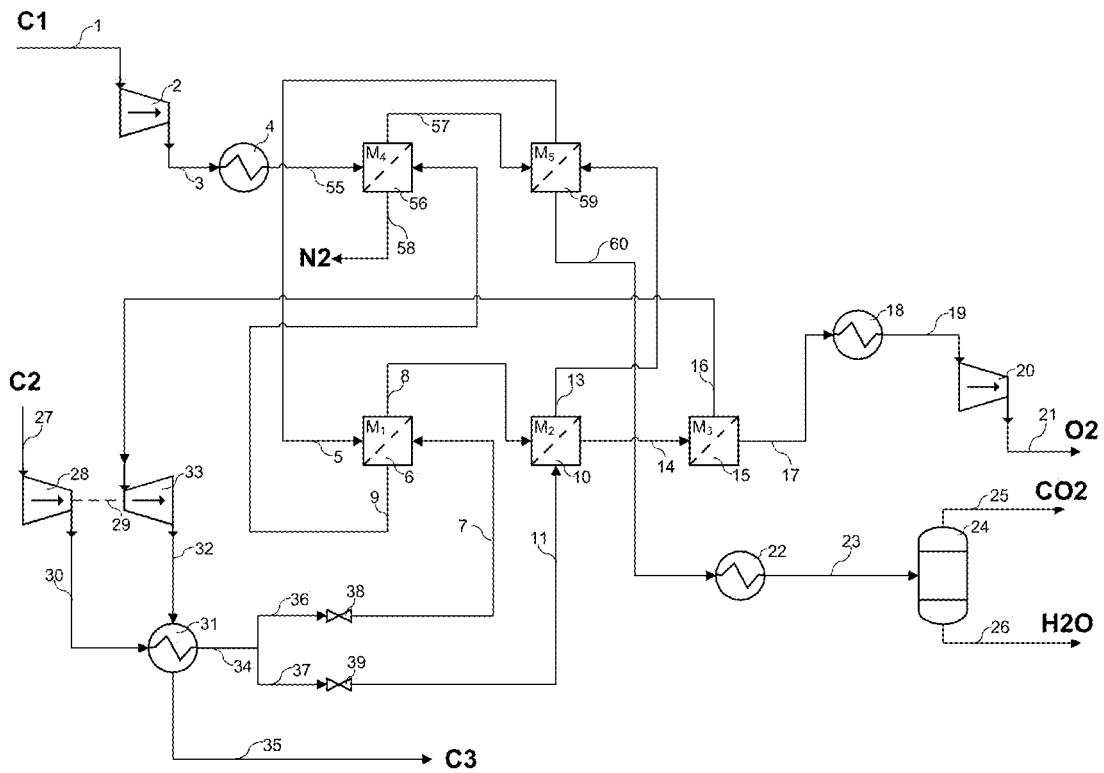
FIG. 6. Diagram of the upgrading process of industrial streams from ceramic permeation membrane modules purifying the $N_2$ and $CO_2$ streams by means of ceramic membrane modules.

FIG. 6 shows a particular example of a process according to the invention that includes two additional membrane modules ($M_4$ and $M_5$) (56) and (59) for the purification of the $N_2$ and $CO_2$ streams. The $N_2$ (9) (oxygen depleted stream) and $CO_2$ (13) streams produced in the first membrane module (6) and the second membrane module (10) respectively can contain significant amounts of oxygen considering the purity required in their subsequent applications. Oxygen permeation membrane modules will be used for the removal of oxygen that the streams to be purified may contain, wherein the stream to be purified (55) enters the module as a stream that supplies oxygen to the system for $N_2$, and (57) for the $CO_2$). As shown in the figure, the combustible gaseous stream (55) enters these modules as an entrainment stream from the additional modules. The input streams to the first additional module (56) are the combustible gaseous stream (55) and the stream (oxygen depleted) of $N_2$ to be purified (9) that comes from the outlet of the first membrane module (6). The output streams of the first additional membrane module (56) are the combustible gaseous stream (57) and the purified $N_2$ stream (58). The input streams to the second additional module (59) are the combustible gaseous stream (57) that comes from the outlet of the first additional membrane module (56) and the $CO_2$ stream to be purified (13) (it is the combustible gaseous stream, after combustion in the first modules ($M_1$ and $M_2$), therefore it contains $CO_2$ and excess $O_2$ (which is the one removed in the additional modules) coming from the outlet of the second membrane module (10). The output streams of the second additional membrane module (59) are the combustible gaseous stream (5) and the purified $CO_2$ stream (60). Finally, the oxygen extracted from the streams to be purified will cause a slight oxidation in the combustible gaseous stream which will cause a slight increase in temperature. The additional membrane modules (56 and 59) have a countercurrent flow distribution to ensure complete oxygen exchange from the streams to be purified to the combustible streams.

According to a further alternative, another way of purifying the $CO_2$ and/or $N_2$ streams can be the use of polymeric oxygen permeation membranes. In this case, the streams to be purified must be cooled to atmospheric temperature and pressurized in order to carry out the process.

The completely oxidized combustible gaseous stream (13) that comes from the second membrane module (10) is mainly composed of carbon dioxide and water vapor, as in the case of example 1. The same components and procedure are used for its separation as in the case of example 1.

Dosing or volumetric flow control of the incoming and outgoing gaseous streams to the oxygen permeation membrane modules $M_1$ and $M_2$ is carried out by means of a system of valves (38 and 39) as in the case of example 1.

Example 7

Figure 7:
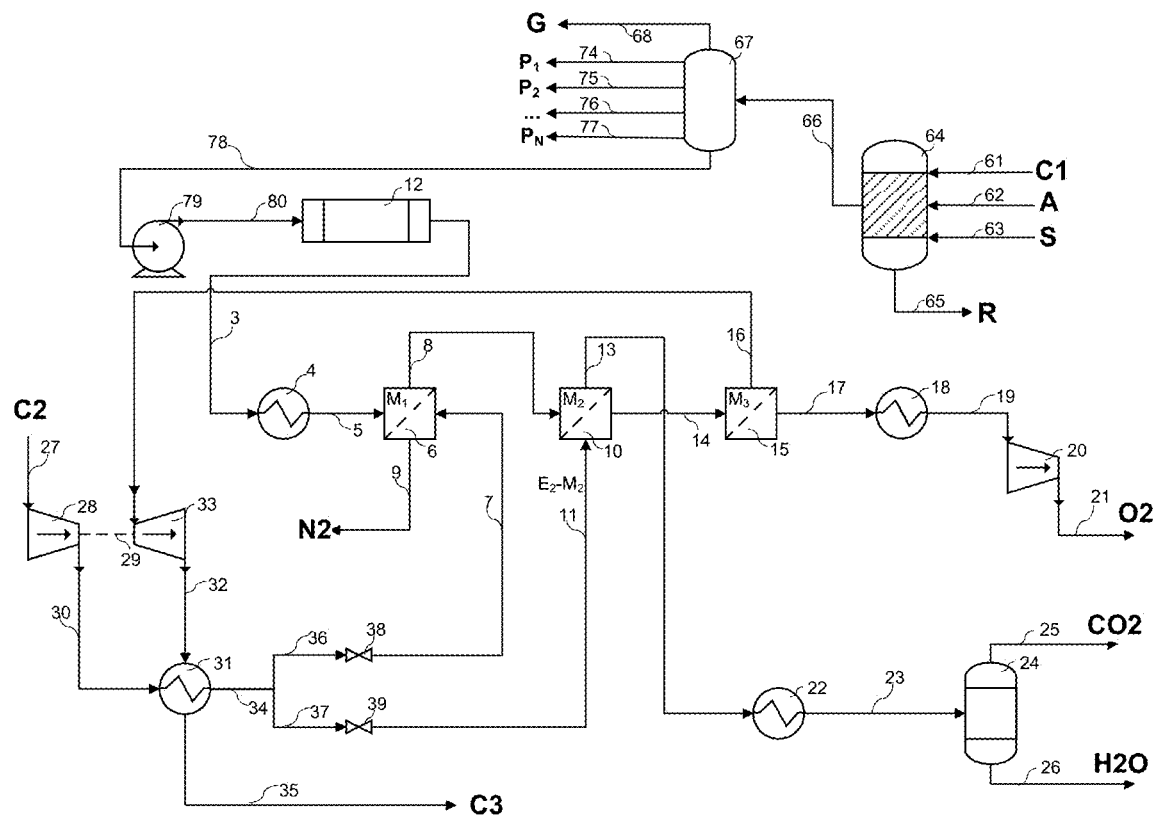
FIG. 7. Diagram of the upgrading process of industrial streams from oxygen permeation ceramic modules integrated in a biomass gasification (or pyrolysis) process.
Figure 8A:
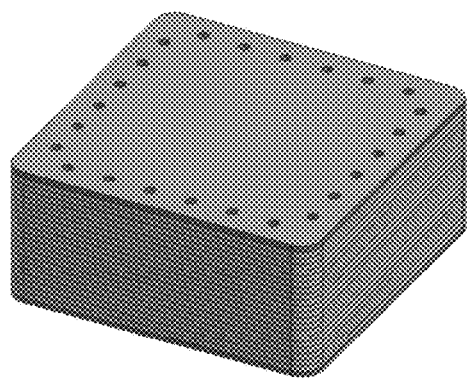
FIG. 8*a* is a perspective view of an oxygen permeation membrane module having 20 membranes with gas streams distributed in cross flow. Reference (70) shows the spacers between membranes and reference (72) shows the outer cover of the module.
Figure 8B:
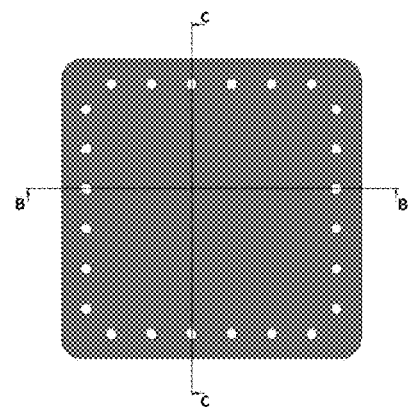
FIG. 8*b* is a plan view of the oxygen permeation membrane module in FIG. 8*a*.
Figure 8C:
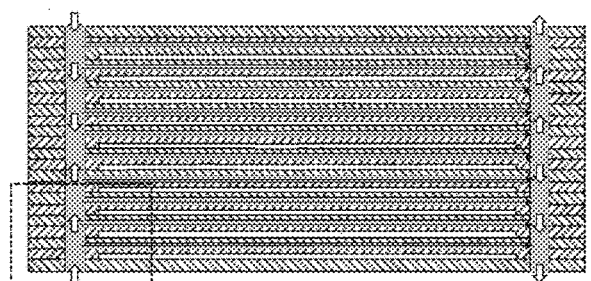
FIG. 8*c* is a sectional view of the oxygen permeation membrane module taken at B-B in FIG. 8*b*.
Figure 8D:
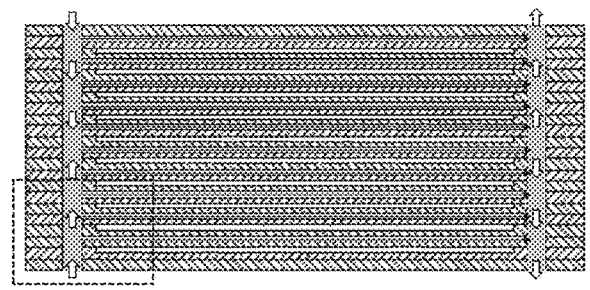
FIG. 8*d* is a sectional view of the oxygen permeation membrane module taken at C-C in FIG. 8*b*.
Figure 8E:
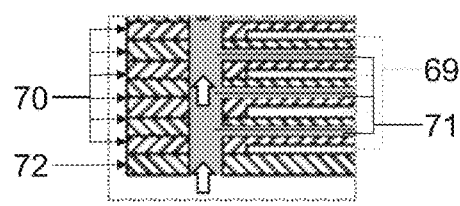
FIG. 8*e* is a partial sectional view of the oxygen permeation membrane module illustrating the highlighted portion of FIG. 8*c*.
Figure 8F:
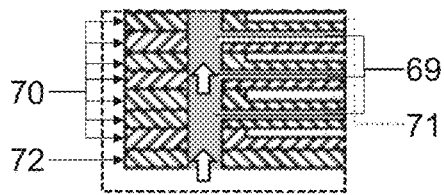
FIG. 8*f* is a partial sectional view of the oxygen permeation membrane module illustrating the highlighted portion of FIG. 8*d*.
Figure 9A:
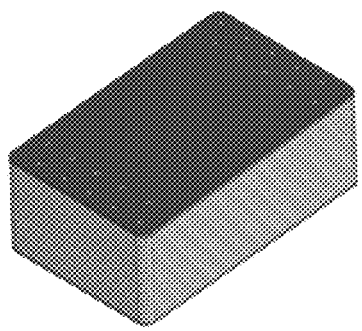
FIG. 9*a* is a perspective view of an oxygen permeation membrane module having 20 membranes with gas streams distributed in co-current or counter-current.
Figure 9B:
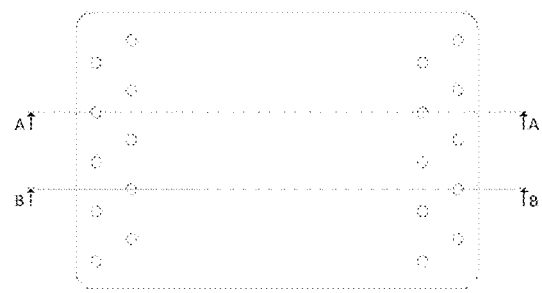
FIG. 9*b* is a plan view of the oxygen permeation membrane module in FIG. 9*a*.
Figure 9C:
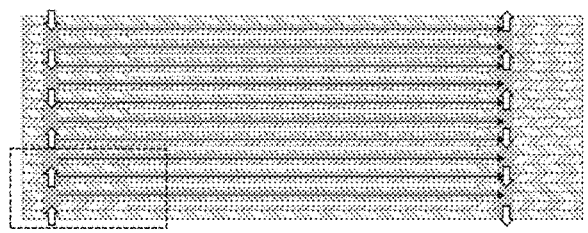
FIG. 9c is a sectional view of the oxygen permeation membrane module taken at A-A in FIG. 9b for co-current flow distribution.
Figure 9D:
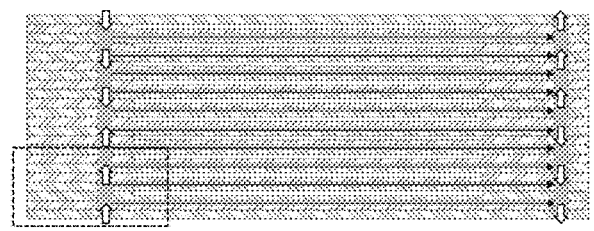
FIG. 9d is a sectional view of the oxygen permeation membrane module taken at B-B in FIG. 9b for co-current flow distribution.
Figure 9E:
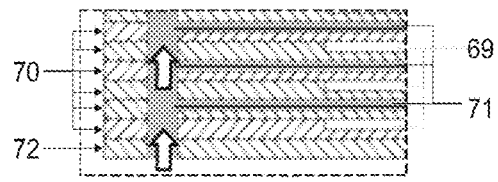
FIG. 9e is a partial sectional view of the oxygen permeation membrane module illustrating the highlighted portion of FIG. 9c.
Figure 9F:
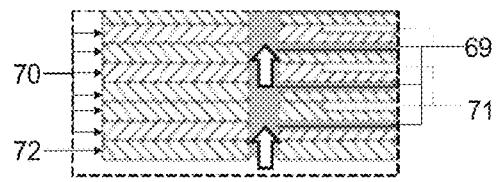
FIG. 9f is a partial sectional view of the oxygen permeation membrane module illustrating the highlighted portion of FIG. 9d.
Figure 9G:
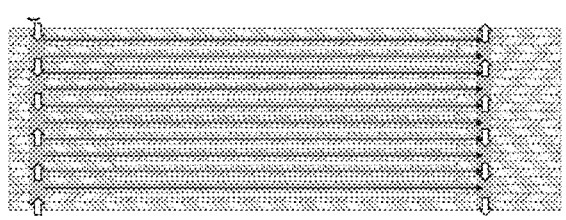
FIG. 9g is a sectional view of the oxygen permeation membrane module taken at A-A in FIG. 9b for counter-current flow distribution.
Figure 9H:
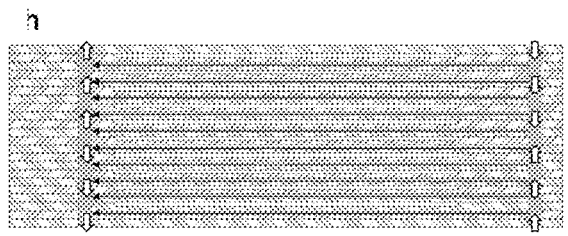
FIG. 9h is a sectional view of the oxygen permeation membrane module taken at B-B in FIG. 9b for counter-current flow distribution.

FIG. 7 shows a particular example of a process according to the invention that integrates the process described in example 1, shown in FIG. 1, in a biomass thermochemical upgrading process. In this case, the source of the combustible stream (C1) is biomass. The biomass is gasified by means of a thermochemical reactor (64). The input streams to the thermochemical reactor (64) are biomass (61), a carrier stream (63), which is composed of an inert gas and can contain water vapor to improve the process (if necessary) and an oxygen rich stream in (62) (unless the thermochemical process is a pyrolysis process, in which case no component is introduced that could cause the oxidation of the material). The output streams of the thermochemical reactor (64) are the gasified stream (66) and the ashes contained in the biomass (65). The gasified stream (66) is led to a fractionation tower (67) to separate the light gases from the heavy gases. The output streams are the light gas streams (68), each of the product streams in which the fractionation is distributed (74, 75, 76, 77) and the liquid stream of heavy compounds (78). In this case, the liquid heavy compound stream (78) represents the starting combustible stream for the membrane modules. Since the stream enters the process in the liquid phase, in this case the stream is driven by a hydraulic pump (79) at operating pressure (considering the pressure drops of the different downstream equipment). The input stream to the hydraulic pump (79) is the heavy liquid stream (78) that comes from the fractionation tower (67). The output stream of the hydraulic pump (79) is the pressurized heavy liquid stream (80). In this case, to bring the combustible stream to the membrane modules conditions, evaporation is required before heating the stream to the operating temperature. For this purpose an evaporator (12) is arranged to gasify the combustible stream. The inlet stream to the evaporator (12) is the heavy compound liquid stream (80) that comes from the hydraulic pump (79). The output stream of the evaporator (12) is the gasified stream of heavy compounds (3). A good design of the membrane

Example 8

Membrane module to produce $N_2$ (not shown in the figures) from air as an oxygen-rich stream and a combustible gaseous stream composed of CO and $CO_2$. The initial input fuel gas stream is composed of 57.10% CO in $CO_2$. The initial input combustible gaseous stream is diluted with $CO_2$ to reduce the increase in temperature due to oxidation reactions such that $$r = \frac{F_{CO2}}{F_i},$$

where r is the molar ratio between the input flow rate of diluted $CO_2$ ($F_{CO2}$) and the initial fuel gaseous input flow rate ($F_i$). Different dilutions from r=2.5 to r=10 have been tested. All the streams enter at 700° C. The airline is pressurized to 2.5 bar absolute pressure. Amounts of air at 25%, 50% and 75% of the stoichiometric amount of air have been used. The considered membrane module has 5 membranes of 380 cm² per membrane. Co-current and countercurrent flow distribution has been considered. The longitudinal distance between the inlet of the module chambers and the outlet of each chamber is 20 cm. The transport of oxygen through the membrane has been simulated from the following equation:

$$J_{O2}(x) = K(T(x)) \cdot \ln\left(\frac{p_{air} \cdot x_{O2,air}}{p_{drag} \cdot (x_{O2,entrainment} + tol)}\right)$$

wherein $J_{O2}$ is the molar flow of oxygen per unit area, K is the permeability constant, pair is the total pressure in the air chamber, $p_{entrainment}$ is the pressure in the entrainment chamber and $x_{O2}$, is the mole fraction of oxygen in chamber i (i is general and indicates the chamber in question, it can be air or entrainment.), T is the temperature, x is the longitudinal coordinate and tol is a parameter to avoid indeterminates in the calculation set at $10^{-5}$. K is calculated as a function of temperature to be able to predict the improvement in permeation as the temperature increases.

The heat transmission has been carried out considering the thermal conduction between the two membrane walls, using the equation:

$$\text{Heat} = k_{MEMB} \cdot \frac{dA}{dx} \cdot (T_{entrainment}(x) - T_{air}(x))$$

wherein $k_{MEMB}$ is the thermal conductivity of the membrane, dA is the membrane area differential, dx is the length differential, $T_i(x)$ is the temperature in chamber i (air or entrainment) at position x, and x represents the longitudinal position.

The oxidation reaction that takes place in the entrainment chamber (69) is: $CO+0.5O_2 \rightarrow CO_2$. The heat of reaction has been calculated using the reaction enthalpy of the combustion reaction. Results are shown in FIG. 11.

Example 9

Membrane module for complete oxidation of a stream with combustible material from air as an oxygen-rich stream and a combustible gaseous stream composed of CO and $CO_2$. The gaseous combustible stream is made up of 9.5% CO in $CO_2$. The temperature of the input streams was varied such that the air stream was introduced at temperatures from 600° C. to 815° C. and the entrainment current was introduced at 600° C. and 700° C. The airline was pressurized at 2.5 bar absolute pressure. Air is introduced in excess, where A is the molar ratio between the input air molar flow rate ($F_{air}$) and the stoichiometric air molar flow rate ($F_{stoichiometric\ air}$), such that $$A = \frac{F_{aire}}{F_{stoichiometric\ air}}$$

Different air excesses were tested, from A=5 to A=20. The considered membrane module has 5 membranes of 380 cm² per membrane. Co-current and countercurrent distribution has been considered. The output temperatures of the air stream and the maximum temperature the system reaches were measured. The longitudinal distance between the inlet of the module chambers and the outlet of each chamber is 20 cm. The transport of oxygen through the membrane was simulated using the following equation:

$$J_{O2}(x) = K(T(x)) \cdot \ln\left(\frac{p_{air} \cdot x_{O2,air}}{p_{entrainment} \cdot (x_{O2,entrainment} + tol)}\right)$$

wherein $J_{O2}$ is the molar flow of oxygen per unit area, K is the permeability constant, $p_{air}$ is the total pressure in the air chamber, $p_{entrainment}$ is the pressure in the entrainment chamber and $x_{O2}$, is the mole fraction of oxygen in chamber i (air or drag), T is the temperature, x is the longitudinal coordinate and tol is a parameter to avoid indeterminates in the calculation, set at $10^{-5}$. K is calculated as a function of temperature to be able to predict the improvement in permeation as the temperature increases.

The heat transmission was carried out considering the thermal conduction between the two membrane walls, using the equation:

$$\text{Heat} = k_{MEMB} \cdot \frac{dA}{dx} \cdot (T_{entrainment}(x) - T_{aire}(x))$$

where $k_{MEMB}$ is the thermal conductivity of the membrane, dA is the membrane area differential, dx is the differential length, $T_i(x)$ is the temperature in chamber i (air or entrainment) at position x and x represents the longitudinal position. The oxidation reaction that occurs in the entrainment chamber (69) is: $CO+0.5O_2 \rightarrow CO_2$. The reaction heat was calculated using the reaction enthalpy of the combustion reaction. The results are shown in FIG. 13.

Example 10

Membrane module for obtaining oxygen from air as an oxygen rich stream and imposing a vacuum.

This example is intended to illustrate the third membrane module of Examples 1, 2, 3, 5, 6, and 7. In these cases, it is an $O_2$ permeation from an $O_2$ rich stream.

The temperature of the input stream was varied from 900° C. to 1050° C. Different pressurizations of the airline were tested from 1 bar to 5 bar absolute pressure.

Two vacuum pressures have been tested: 50 mbar and 100 mbar. Different membrane areas were studied (from 0.5 m³ to 10 m³). The equivalence between membrane area and number of membranes was carried out considering 380 cm² membranes. The oxygen transport through the membrane was simulated using the following equation:

$$J_{O2}(x) = K(T(x)) \cdot \ln\left(\frac{p_{air} \cdot x_{O2,air}}{p_{vacuum}}\right)$$

wherein $J_{O2}$ is the molar flow of oxygen per unit area, K is the permeability constant, pair is the total pressure in the air chamber, $p_{vacuum}$ is the pressure in the entrainment chamber and $x_{O2}$, is the mole fraction of oxygen in chamber i (air or vacuum), T is the temperature, and x is the longitudinal coordinate. K is calculated as a function of temperature to be able to predict the improvement in permeation as the temperature increases. The results are shown in FIG. 14.

Example 11

Flat oxygen permeation membrane modules were designed with various configurations shown in FIGS. 8, 9 and 10. These figures are not intended to give a sample of fixed geometries and planes for the membrane modules but to clarify the internal distribution of the gas streams through the module. Likewise, there are more construction details that can be modified depending on the needs of the module. For example, the number of membranes in the module depending on the needs of the process area or the number of lanes to conduct the currents to the module chambers or extract the gas from the module chambers (identified by the holes FIG. 8.b, FIG. 9.b and FIG. 10.b) can be increased depending on the final dimensions of the module in order to ensure a good distribution of the gas streams in each of the chambers.

FIG. 8 shows the geometry of a flat membrane module (with 20 membranes) with a cross-flow distribution. FIG. 8.c shows the B-B cross section (FIG. 8.b) of the membrane module with cross-flow distribution with the paths of the gaseous stream that passes through the module in the B-B direction. FIG. 8.d shows the C-C cross section (FIG. 8.b) of the membrane module with cross-flow distribution with the paths of the gas stream that passes through the module in the C-C direction (perpendicular to the B-B direction). FIGS. 8.c and 8.d illustrate that the gas streams enter from the top and bottom part of the module and are extracted in the same way with the aim of minimizing pressure drops and equitably distributing the incoming gas stream by the different chambers of the module.

FIG. 9 shows the geometry of a flat membrane module (with 20 membranes) valid for both a co-current distribution and a counter-current flow distribution. The cross sections AA and BB (FIG. 9.b) are parallel planes, so that the gas streams shown in the figures obtained by these cut planes (9.c-h) circulate in the same path with the same direction for the distribution of flows in co-current (FIGS. 9.c and 9.d) or with opposite directions for the distribution of counter-current flows (FIGS. 9.g and 9.h). FIGS. 9.c and 9.d illustrate the gas stream paths using the membrane module in a co-current flow configuration. FIG. 9.e is an enlarged view of FIG. 9.c to detail the flow distribution in the module. FIG. 9.f is an enlarged view of FIG. 9.d to detail the flow distribution in the module. FIGS. 9.g and 9.h illustrate the gas stream paths using the membrane module in a counter-current flow configuration. FIGS. 9.c-h illustrate that the gas streams enter from the top and bottom of the module and are extracted in the same way with the aim of minimizing head losses and equitably distributing the input gas stream through the different chambers. of the module.

FIG. 10 shows the geometry of a flat membrane module where gas streams pass through the membrane module several times in its longitudinal direction. This geometry allows both a co-current distribution and a counter-current flow distribution. Considering as "one passage" each time the gas stream passes through the membrane in its longitudinal direction, FIG. 10 represents a module of 3 passages through the module with 6 membranes per passage. The shear planes AA and BB (FIG. 10.b) are parallel planes, so that the gas streams shown by the figures obtained by these shear planes (10.c-h) go in the same trajectory with the same direction for the co-current flow distribution (FIGS. 10.c and 10.d) or with opposite directions for the distribution of counter-current flows (FIGS. 10.g and 10. h). FIGS. 10.c and 10.d illustrate the gas stream paths using the membrane module in a co-current flow configuration. FIG. 10.e is an enlarged view of FIG. 10.c to detail the flow distribution in the module. FIG. 10.f is an enlarged view of FIG. 10.d to detail the distribution of flows in the module.

FIGS. 10.g and 10.h illustrate the gas stream paths using the membrane module in a countercurrent flow configuration. The gases enter the module from the inner side for the distribution of co-current flows (FIGS. 10.c and 10.d) and for FIG. 10.g and the upper part for FIG. 10.h. The gases leave the module through the upper part thereof for the distribution of co-current flows (FIGS. 10.c and 10.d) and for FIG. 10.g and the lower part for FIG. 10.h.

The invention claimed is:

1. A process to selectively generate and separate gases, comprising:
a first step in which a gas-phase fuel stream and an oxygen rich input stream are passed through a first oxygen separation ceramic membrane module, wherein the gas-fuel stream comprises combustible substances whose oxidation gives rise to gaseous products, the oxygen rich input stream is either water vapor or a portion of an oxygen-depleted stream from a second oxygen separation ceramic membrane module, and the gas-phase fuel stream and the oxygen rich input stream come into contact through a first membrane, a heat exchange takes place between them, and a partially oxidized combustible gas stream is output,
a second step of selective oxygen diffusion in which the partially oxidized combustible gas stream from the first oxygen separation ceramic membrane module and the water vapor are passed through the second oxygen separation ceramic membrane module, such that the output streams from the second oxygen separation ceramic member module are, on the one hand, an oxygen-depleted or completely oxygen-free stream and, on the other hand, a partially oxidized or completely oxidized stream, and
a third step of recovery in which a third oxygen separation ceramic membrane module receives the oxygen-depleted stream from the second oxygen separation ceramic membrane module to extract oxygen such that one of at least two separate outlet streams of at least two gases is oxygen and another of the at least two separate outlet streams is selected from nitrogen, carbon dioxide and hydrogen.

2. The process according to claim 1, wherein in the second step the oxidation of the fuel is complete.

3. The process according to claim 1, wherein the gas exchange between the gas-phase fuel stream and the oxygen rich input stream to the membrane modules is carried out at a temperature between 600° C. and 1500° C.

4. The process according to claim 1, further comprising a pressurization step of the gas-phase fuel stream and the oxygen rich input stream in a first gas compressor device, at absolute pressures between 2 and 15 bar, obtaining pressurized input streams.

5. The process according to claim 1, further comprising a pre-heating step of the gas-phase fuel stream and the oxygen rich input stream with heat given off by the outlet streams, obtaining pre-heated pressurized input streams.

6. The process according to claim 1, wherein the flows of the gas-phase fuel stream and the oxygen-rich stream are arranged in countercurrent.

7. The process according to claim 1, wherein in the second oxygen separation ceramic membrane module, cross flows, co-current flows, or counter current flows are used.

8. The process according to claim 1, wherein:
the gas-phase fuel stream leaving a first heat exchanger is pressurized and fed as an input stream to the first membrane module,
the entire oxygen-rich input stream coming from a second heat exchanger is fed into the second oxygen separation ceramic membrane module,
the oxygen-depleted stream leaving the second oxygen separation ceramic membrane module is metered by a system of valves that partially circulate this stream:
  to the first oxygen separation ceramic membrane module as a stream supplying oxygen as an oxygen-depleted stream containing an amount of oxygen less than the stoichiometric amount to completely oxidize the gas-phase fuel stream, and
  to the third oxygen separation ceramic membrane module as a stream supplying oxygen to the third oxygen separation ceramic membrane module and a turbine.

9. The process according to claim 8, wherein
the oxygen depleted output stream from the second membrane module is recirculated to a turbine as a turbine input stream.

10. The process according to claim 8, wherein additional membrane modules are used, in addition to the first, second and third oxygen separation ceramic membrane modules, wherein the additional membrane modules purify the gas streams produced in the first oxygen separation ceramic membrane module and the second oxygen separation ceramic membrane module by removing oxygen therefrom, and
the gas-phase fuel stream enters the additional modules as an entrainment stream.

11. The process according to claim 10, wherein the additional membrane modules have a countercurrent flow distribution to ensure the complete exchange of oxygen from the streams to be purified, to the gas-phase fuel streams.

12. The process according to claim 1, wherein the source of the gas-phase fuel stream is biomass, which is gasified by a thermochemical reactor, the input streams to the thermochemical reactor being:
biomass
an entrainment stream consisting of an inert gas.

13. The process according to claim 1, wherein the input stream, containing combustible materials, comprises one or more products selected from CO, H2, H2S, methane, liquefied petroleum gases, alcohols, olefins, peroxides, aromatic compounds, organic acids, organic amines, naphtha, asphalt, bituminous, diesel, vegetable, animal or mineral oils or fats, coals, and mixtures thereof.

* * * * *